(12) United States Patent
Lim et al.

(10) Patent No.: US 8,964,584 B2
(45) Date of Patent: Feb. 24, 2015

(54) COMMUNICATION TERMINAL AND CLUSTER MONITORING METHOD

(75) Inventors: Boon Ping Lim, Selangor (MY); Ettikan Kandasamy Karuppiah, Selangor (MY); Eiichi Muramoto, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 43 days.

(21) Appl. No.: 13/517,117

(22) PCT Filed: Feb. 23, 2011

(86) PCT No.: PCT/JP2011/001032
§ 371 (c)(1),
(2), (4) Date: Jun. 19, 2012

(87) PCT Pub. No.: WO2012/049788
PCT Pub. Date: Apr. 19, 2012

(65) Prior Publication Data
US 2013/0215789 A1      Aug. 22, 2013

(30) Foreign Application Priority Data

Oct. 12, 2010   (JP) ................................ 2010-229920

(51) Int. Cl.
*H04L 12/28*    (2006.01)
*H04L 12/26*    (2006.01)
(Continued)

(52) U.S. Cl.
CPC ............ *H04L 41/0803* (2013.01); *H04L 45/04* (2013.01); *H04L 12/185* (2013.01); *H04L 12/1877* (2013.01); *H04L 45/46* (2013.01); *H04L 45/48* (2013.01); *H04L 45/70* (2013.01)
USPC .......................... 370/252; 370/328; 370/254

(58) Field of Classification Search
CPC . H04L 2001/0097; H04L 25/20; H04L 43/08; H04L 43/04; H04L 12/1863; H04L 65/80; H04L 41/12; H04L 45/02; H04L 47/10; H04B 7/15592; H04B 7/15528; H04B 7/15542; H04B 7/14; H04B 7/15; H04W 40/12; H04W 40/22; H04W 88/04; H04W 84/047; H04W 16/26; H04W 72/085; H04W 84/18; H04W 84/22; H04W 84/02; H04W 52/46
USPC ............ 370/229–338; 455/7, 9, 16, 464, 518
See application file for complete search history.

(56) References Cited

U.S. PATENT DOCUMENTS 6,229,792 B1 * 5/2001 Anderson et al. ............. 370/280
6,829,561 B2 * 12/2004 Keller et al. ................... 702/179

(Continued)

FOREIGN PATENT DOCUMENTS

| CN | 101637007 A | 1/2010 |
| JP | 2003-078530 A | 3/2003 |

(Continued)

OTHER PUBLICATIONS

International Search Report for PCT/JP2011/001032 dated May 31, 2011.

*Primary Examiner* — Wutchung Chu
(74) *Attorney, Agent, or Firm* — Pearne & Gordon LLP

(57) ABSTRACT

It is an object to provide a communication terminal capable of determining a cluster formation so as to promptly perform addition of a participant terminal, while maintaining the quality of a stream relay path. Cluster monitoring terminal (430) is an apparatus to determine a cluster formation in a network performing packet transfer according to terminal relay-type multipoint communication, and includes: a cluster quality calculation section (432) for acquiring cluster quality representing a small loss in a packet to be received, per a cluster; a cluster sustainability calculation section (433) for acquiring cluster sustainability representing ease of acceptance of a participant terminal, per a cluster; and cluster division/integration analysis section (434) for determining cluster division with respect to a cluster having low cluster quality, and determining integration with other cluster with respect to a cluster having high cluster quality and low cluster sustainability.

8 Claims, 27 Drawing Sheets

(51) Int. Cl.
  *H04L 12/24* (2006.01)
  *H04L 12/715* (2013.01)
  *H04L 12/18* (2006.01)
  *H04L 12/753* (2013.01)
  *H04L 12/721* (2013.01)

(56) References Cited

U.S. PATENT DOCUMENTS

| | | | | |
|---|---|---|---|---|
| 7,392,247 | B2 * | 6/2008 | Chen et al. | 707/694 |
| 7,464,147 | B1 * | 12/2008 | Fakhouri et al. | 709/223 |
| 8,271,205 | B2 * | 9/2012 | Reja et al. | 702/19 |
| 8,542,763 | B2 * | 9/2013 | Forenza et al. | 375/267 |
| 8,620,230 | B2 * | 12/2013 | Sanderovitz et al. | 455/101 |
| 2003/0129660 | A1 * | 7/2003 | Zien et al. | 435/7.1 |
| 2004/0022223 | A1 * | 2/2004 | Billhartz | 370/338 |
| 2004/0111397 | A1 * | 6/2004 | Chen et al. | 707/3 |
| 2005/0033858 | A1 * | 2/2005 | Swildens et al. | 709/232 |
| 2005/0286426 | A1 * | 12/2005 | Padhye et al. | 370/238 |
| 2010/0042668 | A1 * | 2/2010 | Liang et al. | 709/201 |
| 2010/0114846 | A1 | 5/2010 | LaChapelle et al. | |
| 2010/0238855 | A1 * | 9/2010 | Yoshida et al. | 370/315 |
| 2010/0302992 | A1 * | 12/2010 | Zhuang | 370/313 |
| 2011/0044193 | A1 * | 2/2011 | Forenza et al. | 370/252 |
| 2013/0107741 | A1 * | 5/2013 | Huang et al. | 370/252 |

FOREIGN PATENT DOCUMENTS

| | | |
|---|---|---|
| JP | 2006-186446 A | 7/2006 |
| JP | 2007-074202 A | 3/2007 |
| JP | 2010-522372 A | 7/2010 |
| JP | 2010-199972 A | 9/2010 |

* cited by examiner

COMMUNICATION TERMINAL AND CLUSTER MONITORING METHOD

TECHNICAL FIELD

A present invention relates to a communication terminal and a cluster monitoring method of determining cluster division/integration in order to construct a stream relay path on a cluster basis, with respect to a network performing packet transfer based on terminal relay-type multipoint communication.

BACKGROUND ART

It is widely known to perform clustering of a network performing stream data packet transfer based on terminal relay-type multipoint communication, on a terminal basis.

An apparatus such as a rendezvous terminal constructing a stream relay path divides a communication terminal in a network into a plurality of clusters in advance. Upon receiving a participation request from a communication terminal (hereinafter referred to as "participant terminal") wishing to newly participate in a session, this apparatus selects a parent terminal candidate for this participant terminal. Also, this apparatus measures bandwidth and delay among a participant terminal and parent terminal candidates, determines an appropriate parent terminal based on the measurement result, and reconstructs a stream relay path of a cluster including the parent terminal.

Especially in a large-scale network, by constructing a stream relay path on a cluster basis, it is possible to reduce a time required to measure the bandwidth and delay.

However, a large number of communication terminals belonging to one cluster cannot effectively reduce the time for measuring the bandwidth and delay. Also, a small number of communication terminals belonging to one cluster provides little flexibility for reconstructing the stream relay path, thereby making it difficult to receive a participant terminal. Thus, for example, patent document 1 discloses a technology to divide/integrate a cluster according to the number of communication terminals belonging to a cluster.

In the technique described in patent document 1, a super node arranged for each cluster monitors the number of communication terminals belonging to a cluster under monitoring. When the number of the communication terminals exceeds a first threshold, the super node determines to divide the cluster under monitoring. When the number of the communication terminals goes below a second threshold, the super node determines to integrate the cluster with other cluster. By this means, it is possible to promptly perform addition of a participant terminal.

CITATION LIST

Patent Literature

PTL 1
U.S. Patent Application Publication No. 2006/0114846

SUMMARY OF INVENTION

Technical Problem

However, with the technique described in patent document 1, there is a problem that the quality of a reconstructed stream relay path may decrease. This is because when a participant terminal is added, the stream relay path is reconstructed by distributing available resources in a cluster, and therefore, when the number of cluster resources is small, the quality of the stream relay path may be deteriorated.

It is therefore an object of the present invention to provide a communication terminal and a cluster monitoring method capable of determining a cluster formation so as to promptly perform addition of a participant terminal, while maintaining the quality of a stream relay path.

Solution to Problem

A communication terminal of the present invention is a communication terminal determining a cluster formation to construct a stream relay path on a cluster basis in a network performing packet transfer according to terminal relay-type multipoint communication, the communication terminal having: a cluster quality calculation section for acquiring cluster quality representing a small loss in a packet to be received, per the cluster; a cluster sustainability calculation section for acquiring cluster sustainability representing ease of acceptance of a participant terminal, per the cluster; and a cluster division/integration analysis section for determining cluster division with respect to a cluster having low cluster quality, and determining integration with other cluster with respect to a cluster having high cluster quality and low cluster sustainability.

A cluster monitoring method of the present invention is a cluster monitoring method determining a cluster formation to construct a stream relay path on a cluster basis in a network performing packet transfer according to terminal relay-type multipoint communication, the cluster monitoring method having: acquiring cluster quality representing a small loss in a packet to be received and cluster sustainability representing ease of acceptance of a participant terminal, per the cluster; and determining cluster division with respect to a cluster having low cluster quality, and determining integration with other cluster with respect to a cluster having high cluster quality and low cluster sustainability.

Advantageous Effects of Invention

The present invention can determine a cluster formation so as to promptly perform addition of a participant terminal, while maintaining the quality of a stream relay path.

DESCRIPTION OF EMBODIMENTS

Figure 1:
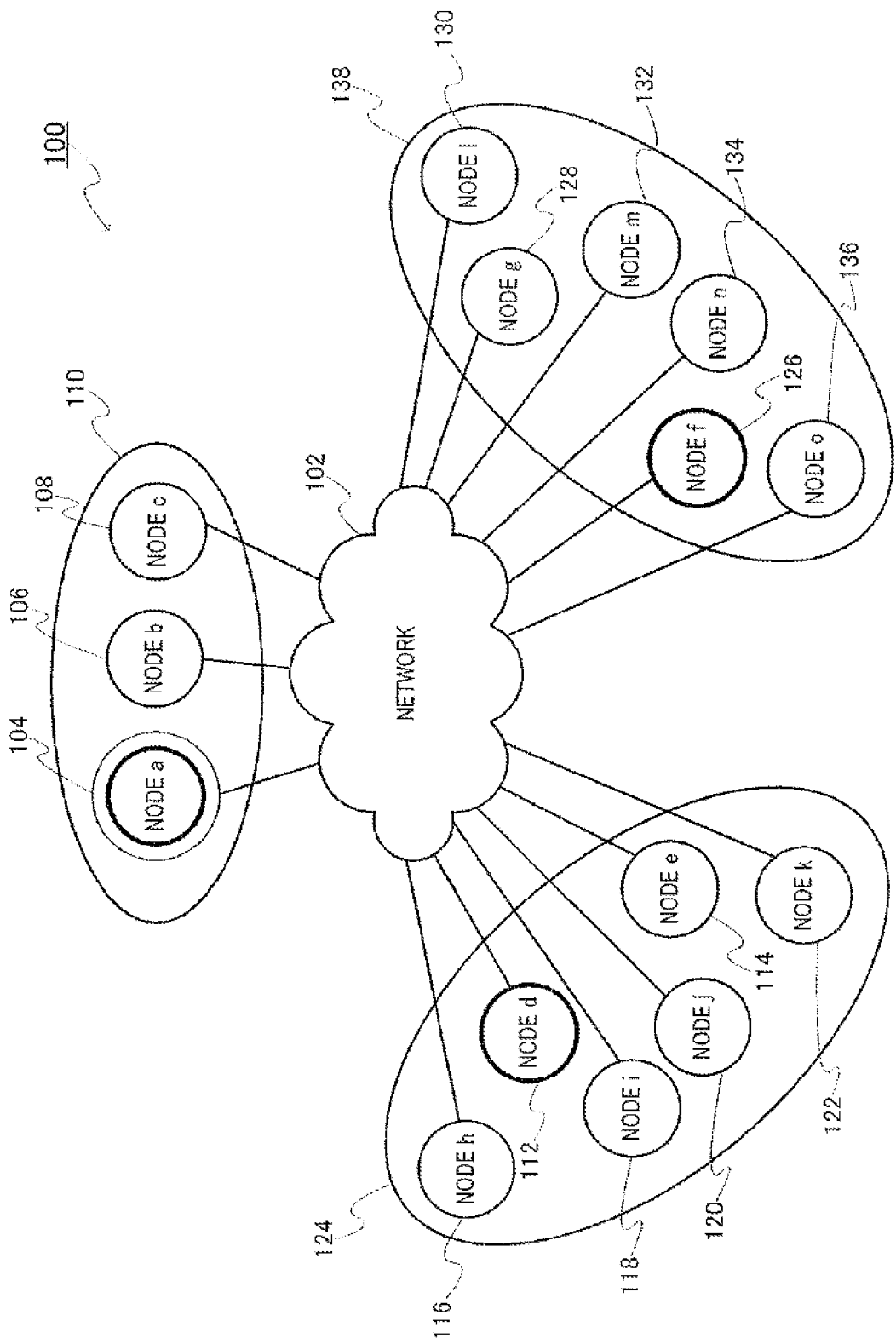
FIG. 1 is a system configuration diagram showing an example of a network system configuration according to an embodiment of the present invention.

Hereinafter, an embodiment of the present invention will be explained in detail with reference to the accompanying drawings.

First, before explaining the present embodiment, the definitions of main terms according to the present embodiment will be described.

"Terminal relay-type multipoint communication" is the logical session connected via a network in a multiparty operation. Here, a multiparty operation is the operation where a plurality of communication terminals having functions to receive, repeat, and transfer a packet, exchange data packets at the same time.

"Cluster" is the group of communication terminals grouped as a unit for reconstructing a stream relay path upon adding a communication terminal to a network.

"Cluster monitoring terminal" is the communication terminal including a communication terminal according to the present invention, and a communication terminal having a function to determine cluster division/integration.

"Main control terminal" is the communication terminal having a function to adjust a network cluster configuration.

"Low loss link" is the network link where loss of a packet (hereinafter, referred to as "packet to be received") transmitted from a communication terminal that is a stream transmission source is almost 0. The communication terminal of a stream transmission source is hereinafter referred to as "route terminal."

"Network link quality" means a small loss in a packet to be received per a network link.

"Local cluster" is the cluster that is a target of the process, or the cluster monitored by a cluster monitoring terminal that is focused on as a target.

"Upstream cluster" is the cluster forming a stream relay path from a route terminal to one of communication terminals in a local cluster.

"Downstream cluster" is the cluster where at least a part of a stream relay path from a route terminal to one of communication terminals in the cluster, is formed by a local cluster.

"Parent cluster" is, among upstream clusters, the cluster having a communication terminal directly connected to a communication terminal in a local cluster.

"Child cluster" is, among downstream clusters, the cluster having a communication terminal directly connected to a communication terminal in a local cluster.

"Cluster sustainability" means the ease of receiving a participant terminal per a cluster, and an ability capable of having sufficient resource to secure a predetermined stream transfer quality, thereby accepting participation of a new communication terminal. Cluster sustainability is calculated using the number of low loss links.

"Cluster sustainability rate" is the value representing the height of a cluster connection possibility.

"Cluster sustainability threshold" is the threshold used for determining cluster division/integration, and the value representing the minimum cluster sustainability required for a cluster.

"Cluster quality" means a small loss in a packet to be received per a cluster, and an ability capable of transmitting a stream with only few packet losses.

"Cluster quality rate" is the value representing the height of cluster quality. The cluster quality rate is calculated using a packet loss rate of a link.

"Cluster quality threshold" is the threshold used for determining cluster division/integration, and the value representing the minimum cluster quality required for a cluster.

"Network link loss rate" is the ratio of the number of lost packets (hereinafter referred to as "the number of loss packets") to the number of packets to be received (hereinafter referred to as "the number of transmission packets") per a network link.

"Poor quality network link" is the network link that is the source of packet loss.

"Cluster delay information" is the value representing the maximum delay from a route terminal to a leaf terminal in the lowest downstream of a cluster.

"Network link delay information" is the value representing a maximum delay among any communication terminals.

"Contact information" is the information representing a means where a certain communication terminal contacts with other communication terminal, for example an IP (Internet Protocol) address.

"Network pass" is the information representing which upstream communication terminal the communication terminal directly connects to, per a communication terminal, for example, an IP address of an upstream communication terminal (parent terminal).

FIG. 1 is a system configuration diagram showing an example of a network system configuration controlled by a cluster monitoring terminal according to the present embodiment.

In FIG. 1, network system 100 includes a plurality of communication terminals (hereinafter, appropriately referred to as "node") 104 to 108, 112 to 122, and 126 to 136 that are connected to the same network 102 such as the internet. Each communication terminal can exchange an AV (Audio Video) stream and a control stream at the same time with other communication terminal according to terminal relay-type multipoint communication.

Network system 100 provides clusters 110, 124, and 138 comprising one or a plurality of communication terminals, respectively. Each cluster is dynamically created, changed, and deleted according to participation into a logical session (hereinafter, simply referred to as "session") of stream transfer of a communication terminal, leave from the session, and change of the network status. That is, the session configuration and the cluster configuration in network system 100 are dynamically changed.

Figure 2:
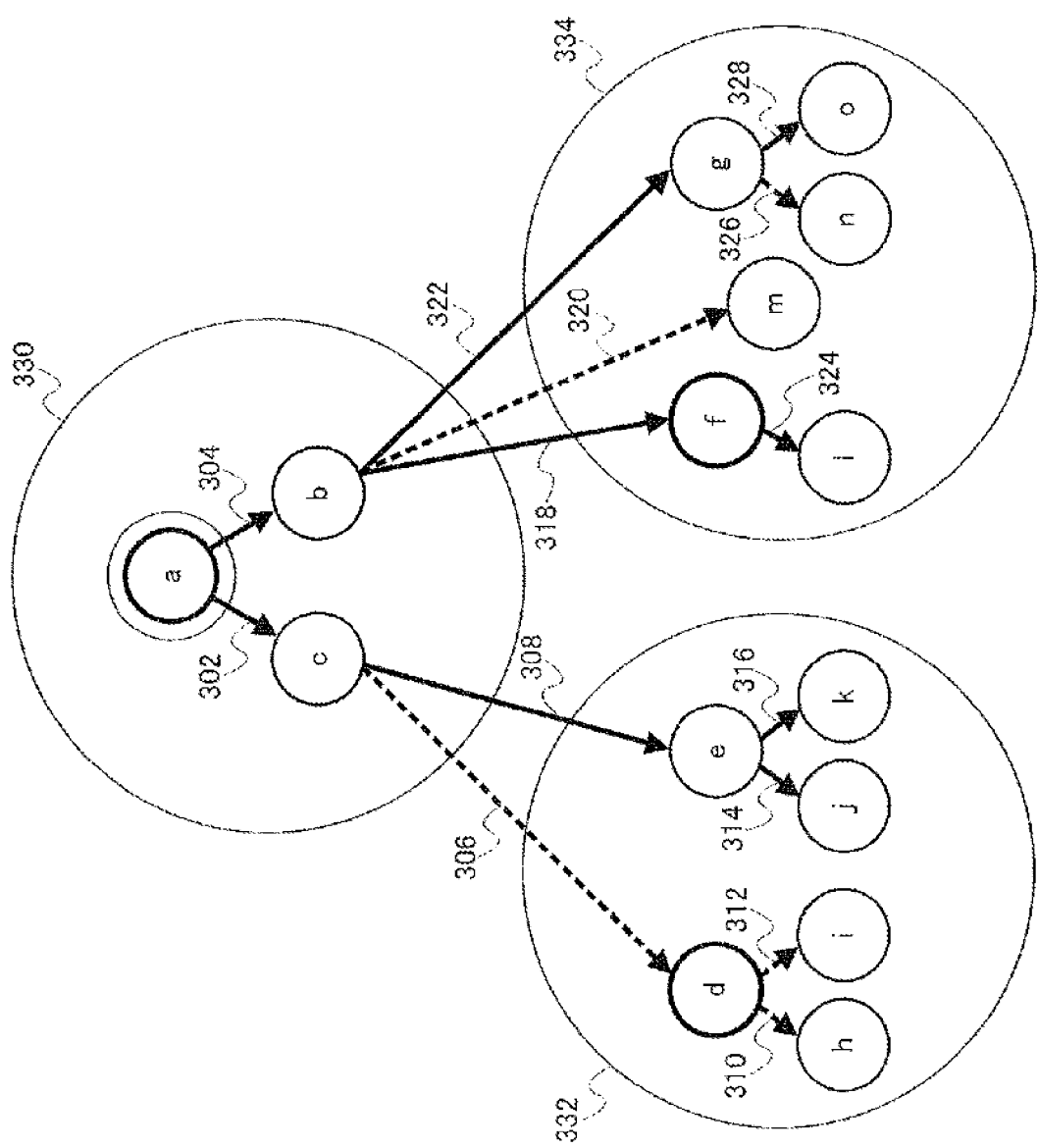
FIG. 2 shows an example of a session configuration and a cluster configuration in an initial state according to the present embodiment.

FIG. 2 shows an example of a session configuration and a cluster configuration in an initial state according to the present embodiment, and corresponds to FIG. 1.

In FIG. 2, an arrow between nodes represents the direction where a network link and stream between nodes flow. Here, it is assumed that node a is a route terminal and starts an AV stream transfer session. Node b and node c receive a stream from node a. These three nodes configure first cluster 330.

Also, node d and node e receive a stream from node c. Node h and node i receive a stream from node d. Node j and node k receive a stream from node e. These six nodes configure second cluster 332.

Also, node f, node g, and node m receive a stream from node b. Node l receives a stream from node f. Node n and node o receive a stream from node g. These six nodes configure third cluster 334.

According to this cluster configuration, the stream transmitted from node a is distributed to all other nodes in a session.

Here, a solid line arrow represents that the network link quality is high, and a broken line arrow represents that the network link quality is low. The packet loss is small between node a and node c, between node a and node b, from node c to node j and node k, from node b to node l, and between from node b to node o. That is, network links 302, 304, 308, 314, 316, 318, 322, 324, and 328 have a small packet loss. Network links 306, 310, 312, 320, and 326 have a large packet loss from node c to node h and node i, between node b and node m, and between node g and node n.

Network system 100 includes a stream transfer function, a cluster monitoring function, and a main control function. The stream transfer function is the function to transfer a stream. The cluster monitoring function is the function to monitor a cluster state. The main control function is the function to start a session among communication terminals of whole network 102, thereby adjusting a session configuration. These functions serve as a logical entity that may exist together or be distributed in one communication terminal or a plurality of communication terminals.

For example, all node a to node o have the stream transfer function. Among the above nodes, node a, node d, and node f further have the cluster monitoring function, and node a that is a route terminal further has the main control function. That is, network system 100 arranges one node having the cluster monitoring function per a cluster.

For ease of explanation, the present embodiment assumes that a stream transfer terminal having the stream transfer function, a cluster monitoring terminal having the cluster monitoring function, and a main control terminal having the main control function.

Hereinafter, a configuration of a communication terminal will be described by dividing into the main control terminal, the cluster monitoring terminal, and the stream transfer terminal.

Figure 3:
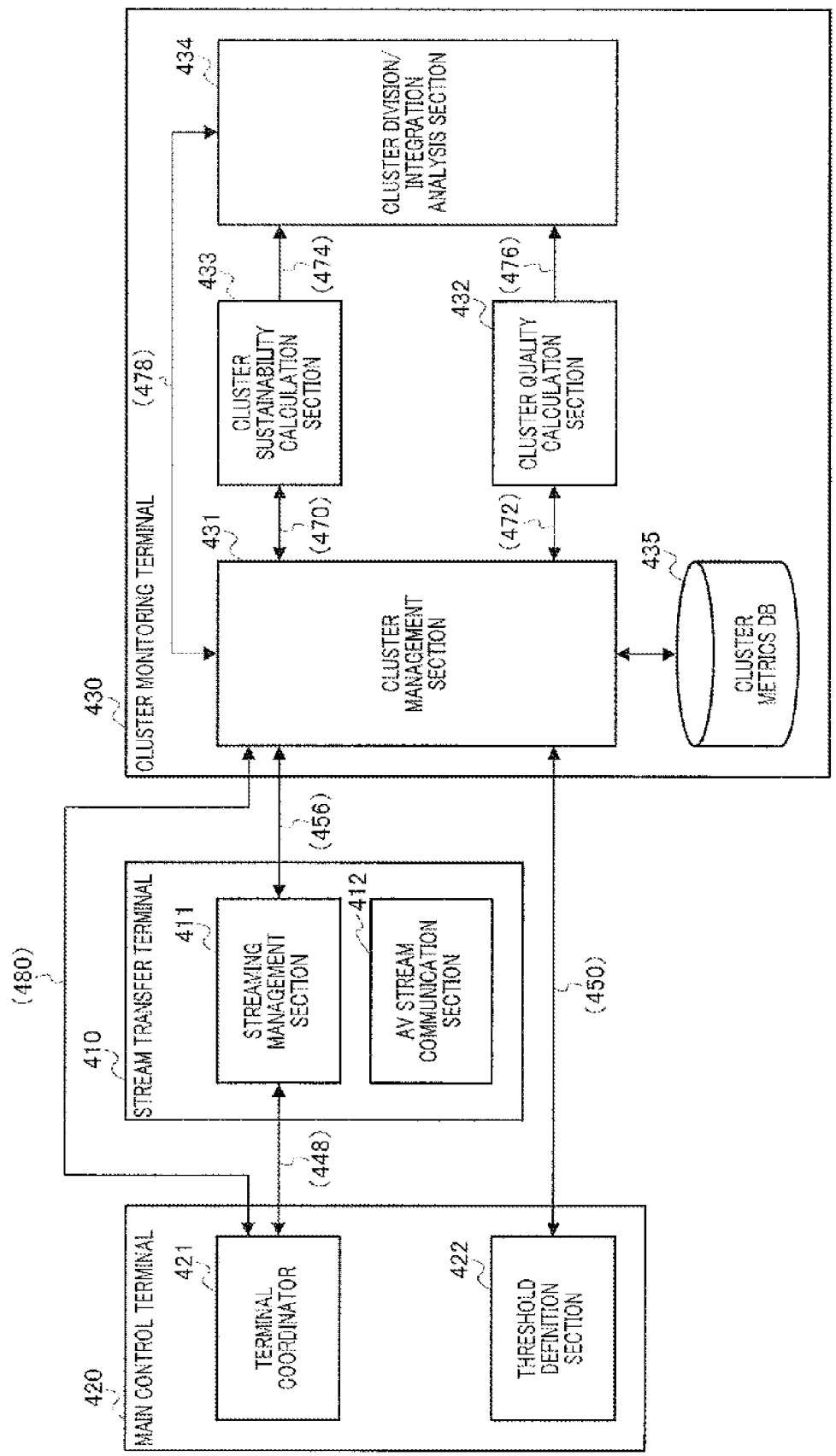
FIG. 3 is a block diagram showing an example of a configuration of each apparatus including a communication terminal according to the present embodiment.

FIG. 3 is a block diagram showing an example of a configuration of each apparatus. The numbers in parentheses in this figure supplementarily explain the information flow.

As shown in FIG. 3, stream transfer terminal 410 includes streaming management section 411 and AV stream communication section 412.

Streaming management section 411 is a control module to establish a session with other stream transfer terminal (not shown).

When stream transfer terminal 410 itself is a participant terminal, streaming management section 411 requests contact information of cluster monitoring terminal 430, with respect to terminal coordinator 421 of main control terminal 420 (described later) (448). Also, streaming management section 411 starts a participation request with respect to cluster monitoring terminal 430 that the contact information indicates (456), while holding the contact information as cluster monitoring terminal connecting information.

Also, streaming management section 411 collects network link loss rate information from other stream transfer terminal receiving the packet that stream transfer terminal 410 transmits. For example, this collection is performed by receiving the packet storing the number of lost packet and an RTP sequence number from stream transfer terminals in downstream. The packet storing the number of lost packet and an RTP sequence number means an RTCP loss video packet, an RTCP loss audio packet, or the like. Streaming management section 411 periodically transmits network link quality information (456: see FIG. 9 described later) including a network link loss rate, with respect to cluster monitoring terminal 430 that the contact information indicates. That is, streaming management section 411 periodically transmits the network link quality information in a local cluster, with respect to a cluster monitoring terminal of a cluster to which stream transfer terminal 410 belongs. Hereinafter, a cluster monitoring terminal is referred to as "cluster monitoring terminal to which stream transfer terminal 410 belongs."

Through a session, AV stream communication section 412 is a data stream transfer module in order to transmit, relay, and receive a stream data packet of an AV content.

Such stream transfer terminal 410 can transmit, relay, and receive stream data. Stream transfer terminal 410 can periodically transmit network link quality information with respect to cluster monitoring terminal 430 to which stream transfer terminal 410 belongs, while performing transmission of such stream data- or the like.

As shown in FIG. 3, main control terminal 420 includes terminal coordinator 421 and threshold definition section 422.

When stream transfer terminal 410 is a participant terminal, terminal coordinator 421 functions as a rendezvous point to make communication between stream transfer terminal 410 and cluster monitoring terminals 430 easier. Terminal coordinator 421 distributes cluster information to each cluster monitoring terminal 430 (480). The cluster information is the information representing a communication terminal of the whole session or any cluster, a network path, network link delay information, and cluster delay information (see FIG. 17 described later).

Threshold definition section 422 periodically collects sustainability information (see FIG. 11 described later) including cluster quality rate and cluster sustainability rate, from all cluster monitoring terminals 430. Threshold definition section 422 adjusts and confirms a cluster quality threshold and a cluster sustainability threshold, based on the content of the collected sustainability information. Threshold definition section 422 transmits threshold information (see FIG. 8 described later) including the adjusted cluster quality threshold and cluster sustainability threshold, to all cluster monitoring terminals 430 (450).

Thus, while performing addition of a participant terminal to a session, main control terminal 420 can adjust a cluster quality threshold and a cluster sustainability threshold, according to the state of the whole network 102.

As shown in FIG. 3, cluster monitoring terminal 430 includes cluster management section 431, cluster quality calculation section 432, cluster sustainability calculation section 433, cluster division/integration analysis section 434, and cluster metrics database (DB) 435.

Cluster management section 431 receives the threshold information (see FIG. 8 described later) from threshold definition section 422 of main control terminal 420 (450), and gives the received threshold information to cluster division/integration analysis section 434 (478). Also, cluster management section 431 receives the network link quality information (see FIG. 9 described later) (456). However, this received network link quality information is the information periodically transmitted from streaming management sections 411 of all stream transfer terminals 410 belonging to a cluster that cluster monitoring terminal 430 monitors. Every time receiving the network link quality information periodically, cluster management section 431 outputs the received network link quality information to cluster sustainability calculation section 433 and cluster quality calculation section 432 (470, 472). Also, cluster management section 431 exchanges cluster metrics information with other cluster monitoring terminals (not shown) that is present in the same stream relay path. This cluster metrics information is the information to report a state in a cluster to other cluster monitoring terminals, and the information including the number of low loss links and a list of low quality network links (see FIG. 10 described later). Also, cluster management section 431 outputs the exchanged cluster metrics information to cluster sustainability calculation section 433 (470).

When receiving a report of the necessity of cluster division from cluster division/integration analysis section 434 described later, cluster management section 431 selects stream transfer terminal 410 that becomes a cluster monitoring terminal in each divided cluster. In this case, cluster management section 431 selects stream transfer terminal 410 having the lowest delay from a route terminal and not forming a low quality link. Cluster management section 431 transmits a cluster division request (see FIG. 12 described later) to the selected stream transfer terminal 410 (456). This cluster division request is the request to be a trigger of cluster division.

Stream transfer terminal 410 accepting the cluster division request becomes new cluster monitoring terminal 430. Cluster management section 431 in new cluster monitoring terminal 430 updates the information related to all stream transfer terminals 410 under monitoring. Also, cluster management section 431 inquires the latest cluster information to main control terminal 420 (480). Cluster management section 431 updates network link delay information of stream transfer terminal 410 that is newly subjected to monitoring (456). Cluster management section 431 performs a path construction process between clusters, when receiving the cluster information and the network link delay information. The path construction process between clusters is the process for determining a parent cluster of a local cluster and constructing a stream relay path in the local cluster. The details of the path construction process between clusters will be described later. This path construction process between clusters is also performed at stream transfer terminal 410 that requests cluster division and whose request is accepted.

When receiving a report of the necessity of cluster integration from cluster division/integration analysis section 434 described later, cluster management section 431 selects cluster monitoring terminal 430 of a cluster that becomes an integrating party. Cluster management section 431 transmits a cluster integration request (see FIG. 21 described later) to the selected cluster monitoring terminal (not shown). This cluster integration request is the request to be a trigger of cluster integration. Cluster management section 431 selects a communication terminal that becomes a cluster monitoring terminal in an integrated cluster. Hereinafter, the side transmitting a cluster integration request is referred to as "integrating side," and the side accepting a cluster integration request is referred to as "integrated side."

Cluster management sections 431 in cluster monitoring terminal 430 of an integrating side and cluster monitoring terminal 430 of an integrated side update the information related to all stream transfer terminals 410 under monitoring. Cluster management section 431 of an integrating side inquires the latest cluster information to main control terminal 420 (480). Cluster management section 431 of an integrating side updates each piece of the network link delay information of stream transfer terminals 410 under monitoring (456). When receiving the cluster information and the network link delay information, cluster monitoring terminal 430 of an integrating side performs a path construction process between clusters.

Cluster management section 431 transmits the update cluster information including contact information of cluster monitoring terminal 430 of a new cluster, to all stream transfer terminals 410 under monitoring (456). Update cluster information (see FIG. 20 described later) is, for example, the information representing a communication terminal in a local cluster, a network path, network link delay information, cluster delay information, a status of cluster division/integration of a local cluster, and so forth. However, it is assumed that only an IP address of the transmission source, the total number n of communication terminals in a new cluster, and an IP address of each communication terminal are described in the update cluster information transmitted from a new cluster to stream transfer terminal 410 under monitoring. This is the same content as a cluster change request described later (see FIG. 14 described later). Cluster management section 431 also transmits update cluster information to terminal coordinator 421 of main control terminal 420 (480).

Based on the network link quality information and the number of low loss links in upstream and downstream clusters, cluster sustainability calculation section 433 calculates a cluster sustainability rate, and outputs the result to cluster division/integration analysis section 434 (474).

Based on the network link quality information, cluster quality calculation section 432 calculates the cluster quality rate, and outputs the result to cluster division/integration analysis section 434 (476).

Based on the threshold information, the cluster sustainability rate and the cluster quality rate, cluster division/integration analysis section 434 determines whether or not division or integration of a cluster belonging to cluster monitoring terminal 430 is necessary. More specifically, when the cluster quality of a local cluster is low, cluster division/integration analysis section 434 determines to divide the cluster. When the cluster quality of a local cluster is high and the cluster sustainability is low, cluster division/integration analysis section 434 determines to integrate the cluster with a parent cluster. Cluster division/integration analysis section 434 outputs the determined result to cluster management section 431 (478).

Cluster metrics database 435 stores all database information including a list of low quality network links. The database information includes threshold information, network link quality information, cluster metrics information, a cluster integration request, a cluster change request, and sustainability information.

When loss of a packet to be received is large, such cluster monitoring terminal 430 can determine to divide a local cluster. When it is difficult to accept a participant terminal, cluster monitoring terminal 430 can determine to integrate the local cluster with its parent cluster. That is, cluster monitoring terminal 430 can determine a cluster formation capable of promptly performing addition of a participant terminal, while acquiring the quality of a stream relay path. Cluster monitoring terminal 430 can construct a stream relay path between a local cluster and other cluster, and a stream relay path inside a local cluster.

Main control terminal 420, stream transfer terminal 410, and cluster monitoring terminal 430 include, for example, a CPU (Central Process Unit), a storage medium such as a ROM (Read Only Memory) storing a control program, a working memory such as a RAM (Random Access Memory), a communication circuit, and so forth (not shown). In this case, the function of each section of each above-described apparatus is implemented by executing the control program on the CPU.

Next, an operation of network system 100 will be described. The operation of the whole system will be described first.

Figure 4:
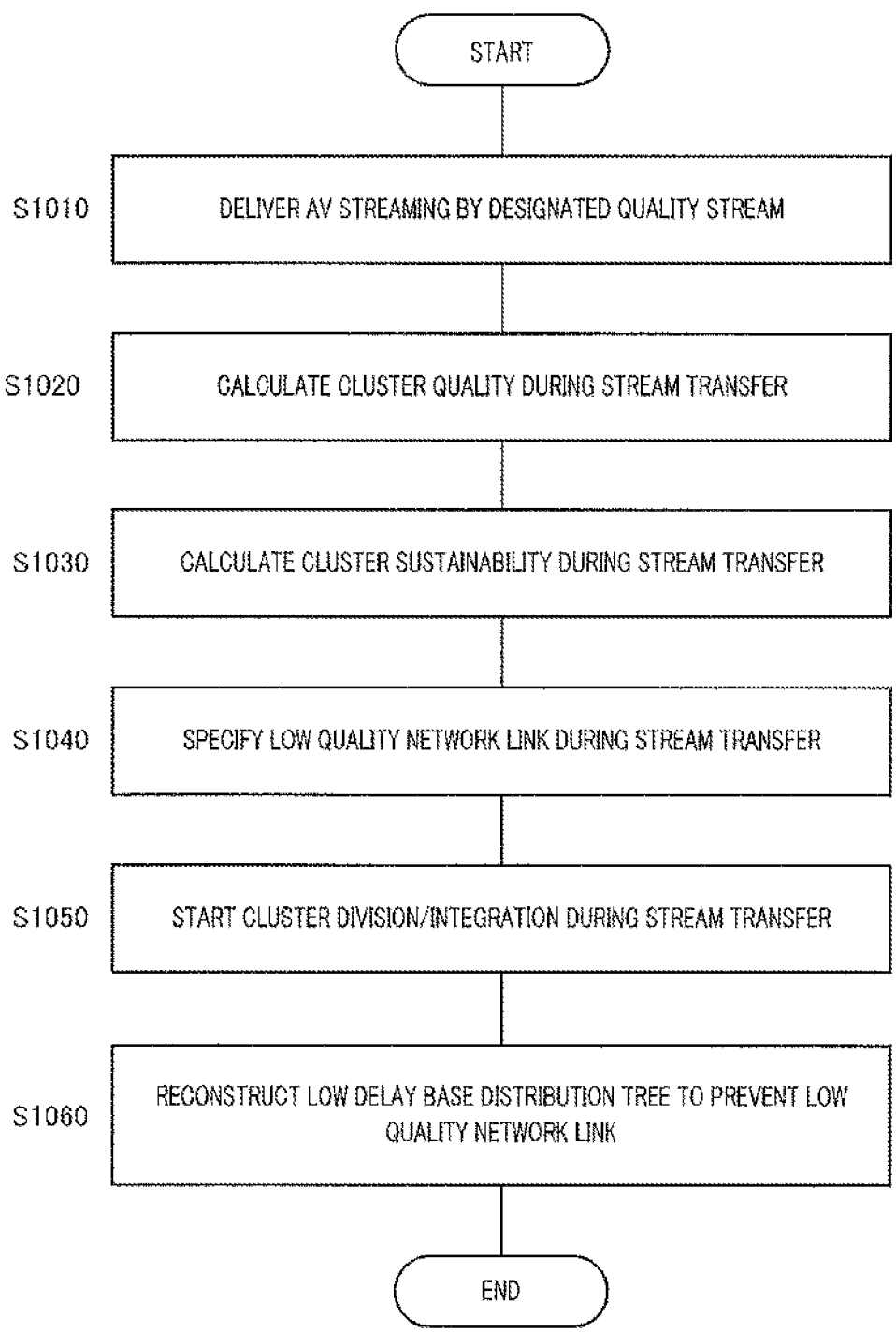
FIG. 4 is a flowchart showing an example of the operation of the whole network system according to the present embodiment.

FIG. 4 is a flowchart showing an example of the operation of the whole network system 100.

A route terminal (node a in FIG. 2) starts a session and starts to deliver an AV stream according to the specified quality stream (S1010). While continuing stream transfer, each stream transfer terminal 410 monitors the quality of network links connecting to the stream transfer terminal, includes the monitoring result into the network link quality information (see FIG. 9 described later), and periodically reports the information to cluster monitoring terminal 430.

While continuing the stream transfer, cluster monitoring terminal 430 calculates cluster quality, based on the network link quality information reported from stream transfer terminals 410 in a local cluster (S1020). While continuing the stream transfer, cluster monitoring terminal 430 calculates cluster sustainability, based on the network link quality information reported from stream transfer terminals 410 in a local cluster (S1030).

Cluster monitoring terminal 430 also specifies a low quality network link, based on the cluster metrics information received from other cluster monitoring terminal and a tree based stream relay path (S1040). When a network link loss rate is almost zero, a network link is classified as high quality, and in contrast, when a network link loss rate is relatively high, the network link is classified as low quality. For example, cluster monitoring terminal 430 may classify the network link where the network link loss rate is equal to or higher than a predefined threshold as a low quality network link. Meanwhile, cluster monitoring terminal 430 may classify the network link where a difference of the network link loss rate between the network link and a network link one to the upstream side, or a ratio of the network link loss rate of the network link to the network link loss rate of a network link one to the upstream side is equal to or higher than the threshold, as a low quality network link.

Cluster monitoring terminal 430 determines cluster division/integration, based on the calculated cluster quality rate and cluster sustainability rate. Also, cluster monitoring terminal 430 starts the cluster division/integration, by transmitting a cluster division request (see FIG. 12 described later) or a cluster integration request (see FIG. 21 described later) to other cluster monitoring terminal (S1050).

As a result, network system 100 performs cluster division/integration as necessary. That is, network system 100 reconstructs a low delay based stream relay path (distribution tree) preventing a low quality network link and having sufficient bandwidth corresponding to the specified stream quality (S1060).

Thus, while distributing an AV stream, network system 100 determines the necessity of cluster division/integration, divides/integrates a cluster appropriately, and thereby performs reconstruction in a low delay based stream relay path.

Next, the flow of information exchange in network system 100 will be described.

Figure 5:
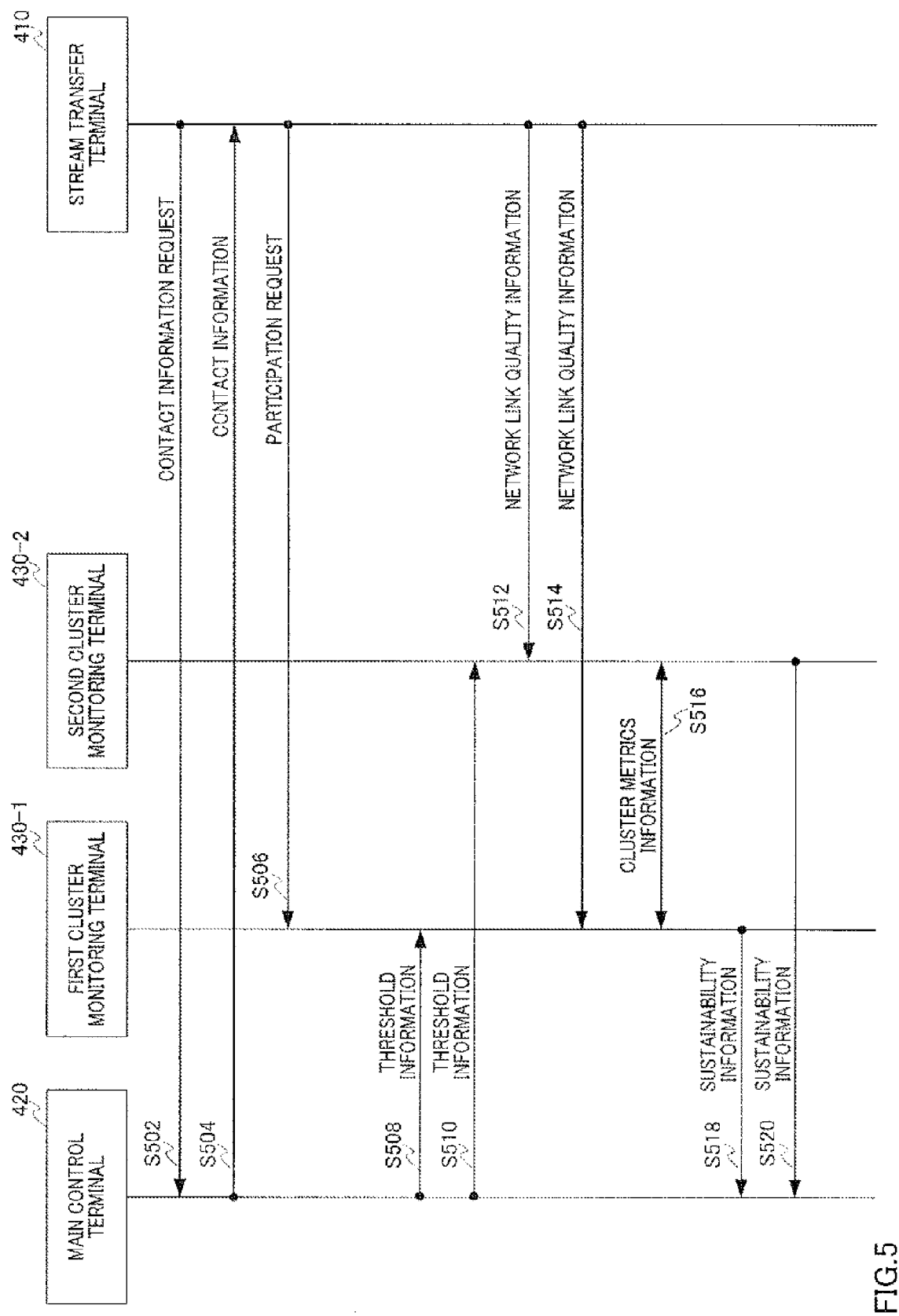
FIG. 5 is a sequence diagram showing an example of an information exchange flow among apparatuses until cluster division/integration is determined, according to the present embodiment.

FIG. 5 is a sequence diagram showing an example of an information exchange flow among apparatuses until cluster division/integration is determined. Here, for ease of explanation, only one main control terminal 420, two cluster monitoring terminals 430, and one stream transfer terminal 410 will be shown.

When attempting to participate in a session, stream transfer terminal 410 transmits a contact information request to main control terminal 420 (S502). As a result, contact information of one or a plurality of cluster monitoring terminals 430 including first cluster monitoring terminal 430-1 is returned (S504). According to the received contact information, stream transfer terminal 410 transmits a participation request to one or a plurality of cluster monitoring terminals 430 including first cluster monitoring terminal 430-1 (S506). Here, it is assumed that stream transfer terminal 410 is determined to be under monitoring of first cluster monitoring terminal 430-1.

Main control terminal 420 transmits threshold information (see FIG. 8 described later), to cluster monitoring terminals 430 (S508 and S510). Even during a session, main control terminal 420 may retransmit the threshold information adjusted according to the network status, capability change of each communication terminal, or the like.

Meanwhile, during steam transfer, each stream transfer terminal 410 reports network link quality information (see FIG. 9 described later) to cluster monitoring terminal 430 to which the stream transfer terminal 410 belongs (S512 and S514).

Each cluster monitoring terminal 430 processes the received network link quality information. Each cluster monitoring terminal 430 exchanges cluster metrics information (see FIG. 10 described later) among all cluster monitoring terminals in an upstream cluster and a downstream cluster (S516). That is, each cluster monitoring terminal 430 exchanges the cluster metrics information among cluster monitoring terminals in a path cluster.

Afterwards, each cluster monitoring terminal 430 calculates a cluster quality rate and a cluster sustainability rate, and transmits sustainability information (see FIG. 11 described later) to main control terminal 420 (S518 and S520).

According to the above operation, cluster monitoring terminals 430-1 and 430-2 acquire the threshold information, the network link quality information of monitored stream transfer terminals 410, and the cluster metrics information of other cluster monitoring terminal 430. Each cluster monitoring terminal 430 analyzes these pieces of information and determines whether or not to perform division/integration of a local cluster.

Figure 6:
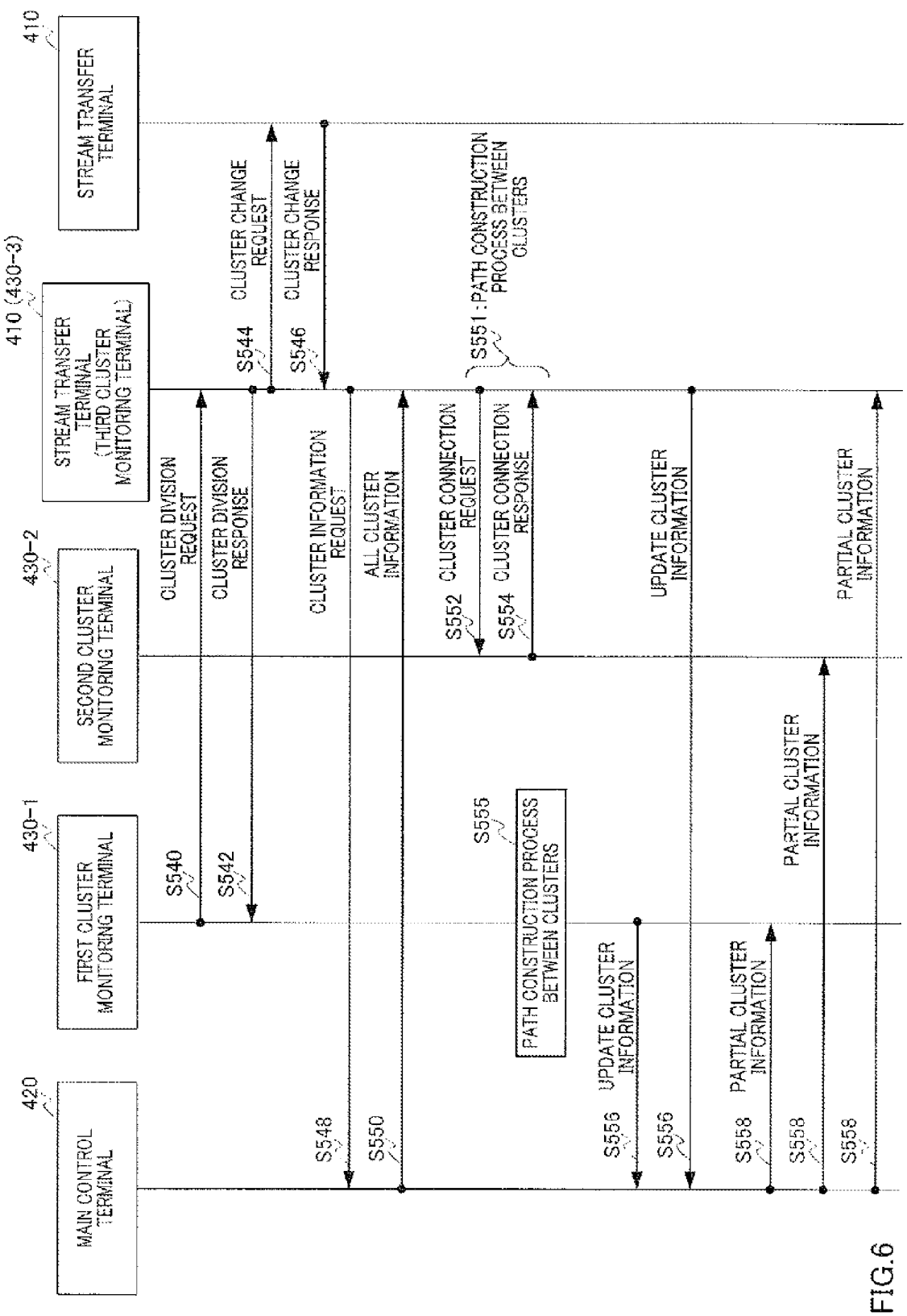
FIG. 6 is a sequence diagram showing an example of an information exchange flow among apparatuses when cluster division is determined, according to the present embodiment.

FIG. 6 is a sequence diagram showing an example of an information exchange flow among apparatuses when cluster division is determined.

It is assumed that first cluster monitoring terminal 430-1 determines stream transfer terminal 410 in a local cluster as new third cluster monitoring terminal 430-3. In this case, first cluster monitoring terminal 430-1 transmits a cluster division request (see FIG. 12 described later) to the determined stream transfer terminal 410 (S540). This cluster division request is the request to be a trigger to set stream transfer terminal 410 as third cluster monitoring terminal 430-3. When the cluster division request is rejected, first cluster monitoring terminal 430-1 transmits the cluster division request to other stream transfer terminal 410 in the local cluster.

When accepting the request, third cluster monitoring terminal 430-3 returns a cluster division response (see FIG. 13 described later) showing the acceptance (S542). Third cluster monitoring terminal 430-3 transmits a cluster change request (see FIG. 14 described later) to all stream transfer terminals 410 in new cluster, as a trigger to measure delay (S544). All stream transfer terminals 410 in the new cluster mean, that is, all stream transfer terminals 410 under monitoring.

Stream transfer terminal 410 receiving the cluster change request measures the delay time among all other terminals in the same cluster. Stream transfer terminal 410 returns a cluster change response (see FIG. 15 described later) including network delay information that is the measurement result (S546). Stream transfer terminal 410 receiving the cluster change request also updates its cluster monitoring terminal connecting information such that subsequent network link loss rate information is transmitted to third cluster monitoring terminal 430-3.

Two clusters formed by division reconstructs the streaming relay paths inside each local cluster. Cluster monitoring terminal 430 that is the source to request cluster division already acquires all cluster information necessary to reconstruct the streaming relay path. Therefore, only new third cluster monitoring terminal 430-3 inquires cluster information to main control terminal 420, and newly acquires the information. At the same time, new third cluster monitoring terminal 430-3 registers the third cluster monitoring terminal 430-3 itself to main control terminal 420. This inquiry and registration is performed by transmitting a cluster information request (see FIG. 16 described later) of "new" status to main control terminal 420 (S548). Main control terminal 420 returns cluster information (see FIG. 17 described later) of all clusters in a session as the response of this request (S550).

New third cluster monitoring terminal 430-3 acquires all information necessary to construct the streaming relay path of the local cluster, according to reception of cluster information and cluster change response. That is, new third cluster monitoring terminal 430-3 acquires an IP address, a list of network links of low quality links, updated network link delay information, a network relay path in a session, cluster delay information and so forth. New third cluster monitoring terminal 430-3 performs a path construction process between clusters (S551).

In this path construction process between clusters, new third cluster monitoring terminal 430-3 determines second cluster monitoring terminal 430-2 as a parent cluster candidate. In this case, new third cluster monitoring terminal 430-3 transmits a cluster connection request (see FIG. 18 described later) requesting connection between clusters, to second cluster monitoring terminal 430-2 (S552).

Second cluster monitoring terminal 430-2 receiving the cluster connection request responds per the requested connection relationship, by returning a cluster connection response (see FIG. 19 described later) (S554). First cluster monitoring terminal 430-1 performs a path construction process between clusters in the same way as new third cluster monitoring terminal 430-3 (S555). Next, first cluster monitoring terminal 430-1 feeds back network relay path information and update cluster information (see FIG. 20 described later) in "new" status, to main control terminal 420 (S556). Network relay path information means a network path of each communication terminal included in the update cluster information. By receiving the update cluster information, main control terminal 420 transmits partial cluster information regarding to the cluster, to each cluster monitoring terminal 430 (S558). By this means, the cluster information that each cluster monitoring terminal 430 holds is updated.

According to the above operation, one cluster is divided into a plurality of clusters in accordance with the cluster division determination.

Figure 7:
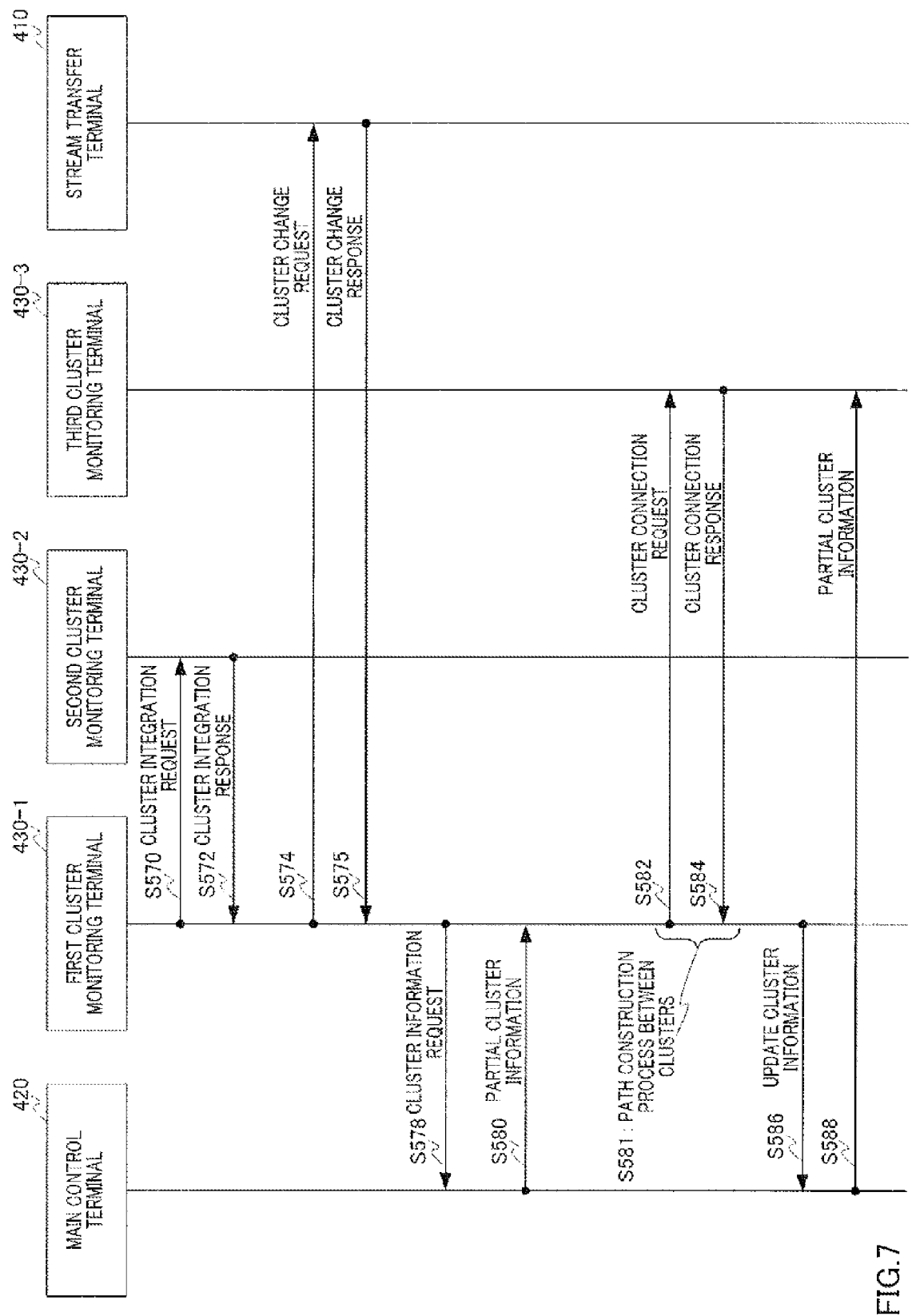
FIG. 7 is a sequence diagram showing an example of an information exchange flow among apparatuses when cluster integration is determined, according to the present embodiment.

FIG. 7 is a sequence diagram showing an example of an information exchange flow among apparatuses when cluster integration is determined.

It is assumed that first cluster monitoring terminal 430-1 selects second cluster monitoring terminal 430-2 shown in FIG. 5 as the integration target. In this case, first cluster monitoring terminal 430-1 transmits a cluster integration request (see FIG. 21 described later) that requests cluster integration, to selected second cluster monitoring terminal 430-2 (S570). When second cluster monitoring terminal 430-2 has also determined the cluster integration, second cluster monitoring terminal 430-2 accepts this cluster integration request and responds a cluster integration response (see FIG. 22 described later) in "acceptance" status (S572). This cluster integration response includes the network link delay information of a cluster of second cluster monitoring terminal 430-2 and a list of low quality network links. When the cluster integration request is rejected, first cluster monitoring terminal 430-1 selects the next other cluster monitoring terminal, and therefore transmits a cluster integration request.

When the cluster integration request is accepted, first cluster monitoring terminal 430-1 transmits a cluster change request (see FIG. 14 described later) to all stream transfer terminals 410 in the local cluster (S574). This cluster change request is the request to be a trigger to measure delay.

Stream transfer terminal 410 receiving the cluster change request measures the delay time among all other terminals in the same cluster. Stream transfer terminal 410 returns a cluster change response (sec FIG. 15 described later) including network delay information that is the measurement result (S575). Stream transfer terminal 410 receiving the cluster change request updates its cluster monitoring terminal connecting information, such that subsequent network link loss rate information is transmitted to first cluster monitoring terminal 430-1.

First cluster monitoring terminal 430-1 transmits the cluster information request (see FIG. 16 described later) in "continuous" status to main control terminal 420. By this means, first cluster monitoring terminal 430-1 requests partial cluster information regarding to a local cluster, to main control terminal 420 (S578). Main control terminal 420 returns the requested partial cluster information (see FIG. 17 described later) (S580).

First cluster monitoring terminal 430-1 acquires all information necessary to construct a streaming relay path of the local cluster, through reception of the cluster information and the cluster change response. That is, first cluster monitoring terminal 430-1 acquires an IP address, a list of network links of low quality links, updated network link delay information, a network relay path of a session, cluster delay information and so forth. First cluster monitoring terminal 430-1 performs a path construction process between clusters (S581).

It is assumed that, in this path construction process between clusters, first cluster-monitoring terminal 430-1 determines third cluster monitoring terminal 430-3 as a parent cluster candidate. In this case, first cluster monitoring terminal 430-1 transmits a cluster connection request (see FIG. 18 described later) to third cluster monitoring terminal 430-3 (S582).

Third cluster monitoring terminal 430-3 receiving the cluster connection request responds per the requested connection relationship (S584), by returning the cluster connection response (see FIG. 19 described later). When the path construction process between clusters is completed, first cluster monitoring terminal 430-1 feeds back update cluster information of "integrating" status (see FIG. 20 described later) and network relay path information, to main control terminal 420 (S586). In order to cancel the function as second cluster monitoring terminal 430-2 that is the integrated side, first cluster monitoring terminal 430-1 transmits, for example, two pieces of update cluster information (see FIG. 20 described later) to main control terminal 420 (S586). For example, the first update cluster information is the information of a new cluster, and the second update cluster information is the information of the cluster to be cancelled.

After receiving the update cluster information, main control terminal 420 transmits partial cluster information (see FIG. 17 described later) to cluster monitoring terminal 430 that is a connection destination of the transmission source of the update cluster information (S588). Here, cluster monitoring terminal 430 is third cluster monitoring terminal 430-3. However, this partial cluster information is the partial cluster information relating to a local cluster of cluster monitoring terminal 430 (in this case, a local cluster of third cluster monitoring terminal 430-3). The cluster information that cluster monitoring terminal 430 holds is updated.

According to the above operation, a plurality of clusters are integrated into one cluster in accordance with the cluster integration determination.

As described above, network system 100 exchanges a variety of information among apparatuses.

Here, a configuration of each piece of information exchanged in network system 100 will be described.

Figure 8:
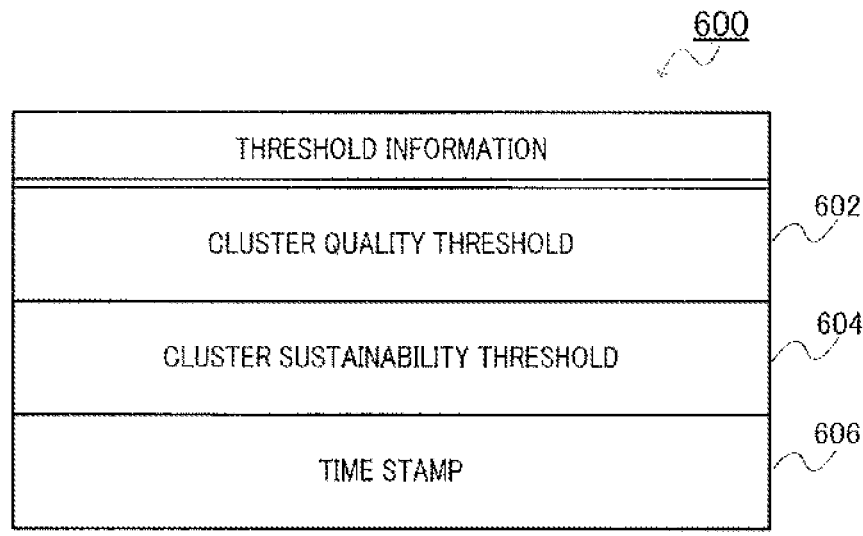
FIG. 8 shows an example of a configuration of threshold information according to the present embodiment.

FIG. 8 shows an example of a configuration of threshold information.

As shown in FIG. 8, threshold information 600 includes cluster quality threshold 602, cluster sustainability threshold 604, and time stamp 606. Time stamp 606 indicates the time when cluster quality threshold 602 and cluster sustainability threshold 604 are confirmed at main control terminal 420.

Figure 9:
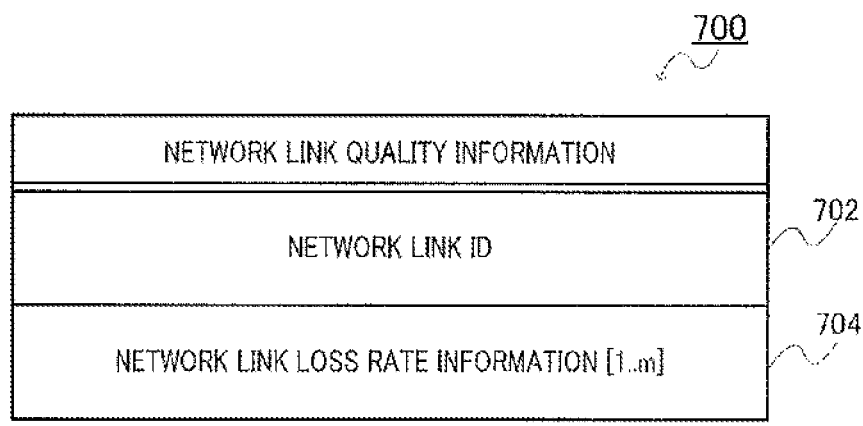
FIG. 9 shows an example of a configuration of network link quality information according to the present embodiment.

FIG. 9 shows an example of a configuration of network link quality information.

As shown in FIG. 9, network link quality information 700 includes network link ID 702, and network link loss rate information 704 associated with this network link ID 702. Here, network link ID is the identification information of a stream relay path uniquely allocated for each stream relay path. Network link loss rate information is the information comprising one or a plurality (m) of network link loss rates.

Figure 10:
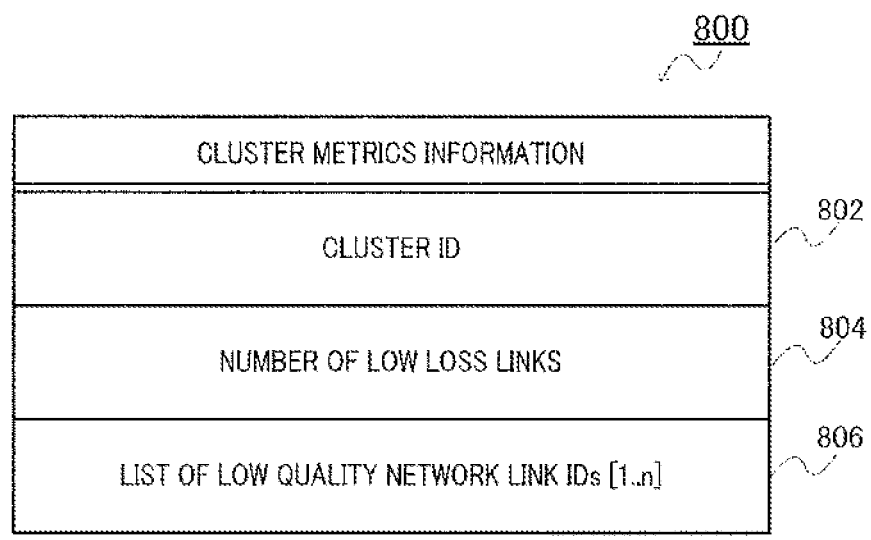
FIG. 10 shows an example of a configuration of cluster metrics information according to the present embodiment.

FIG. 10 shows an example of a configuration of cluster metrics information.

As shown in FIG. 10, cluster metrics information 800 includes cluster ID 802, and the number of low loss links 804 and network link ID list 806 corresponding to this cluster ID 802. Here, cluster ID is the cluster identification information uniquely allocated per each cluster, and the numerical value allocated by, for example, main control terminal 420 and an IP address of cluster monitoring terminal 430. Network link ID list 806 is the list of the number (n) of low quality link network IDs in a cluster that cluster ID 802 indicates.

Figure 11:
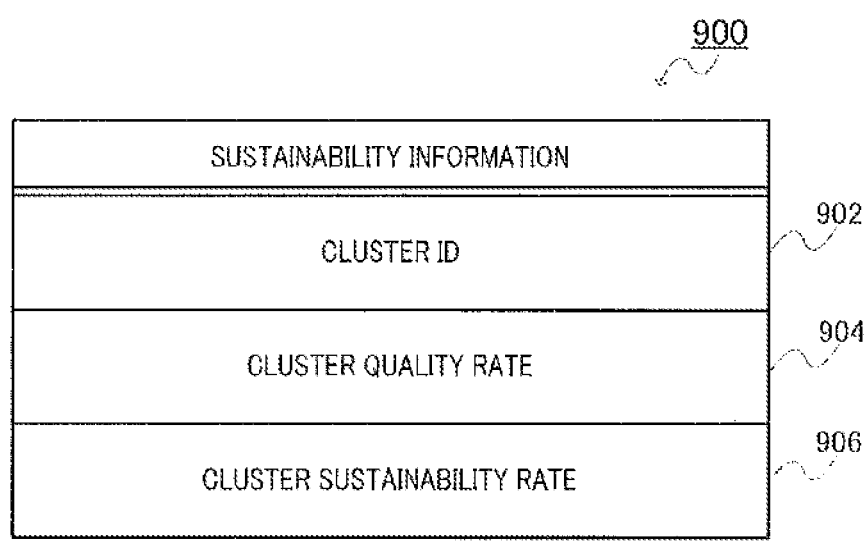
FIG. 11 shows an example of a configuration of sustainability information according to the present embodiment.

FIG. 11 shows an example of a configuration of sustainability information.

As shown in FIG. 11, sustainability information 900 includes cluster ID 902, and cluster quality rate 904 and cluster sustainability rate 906 of a cluster that cluster ID 902 indicates.

Figure 12:
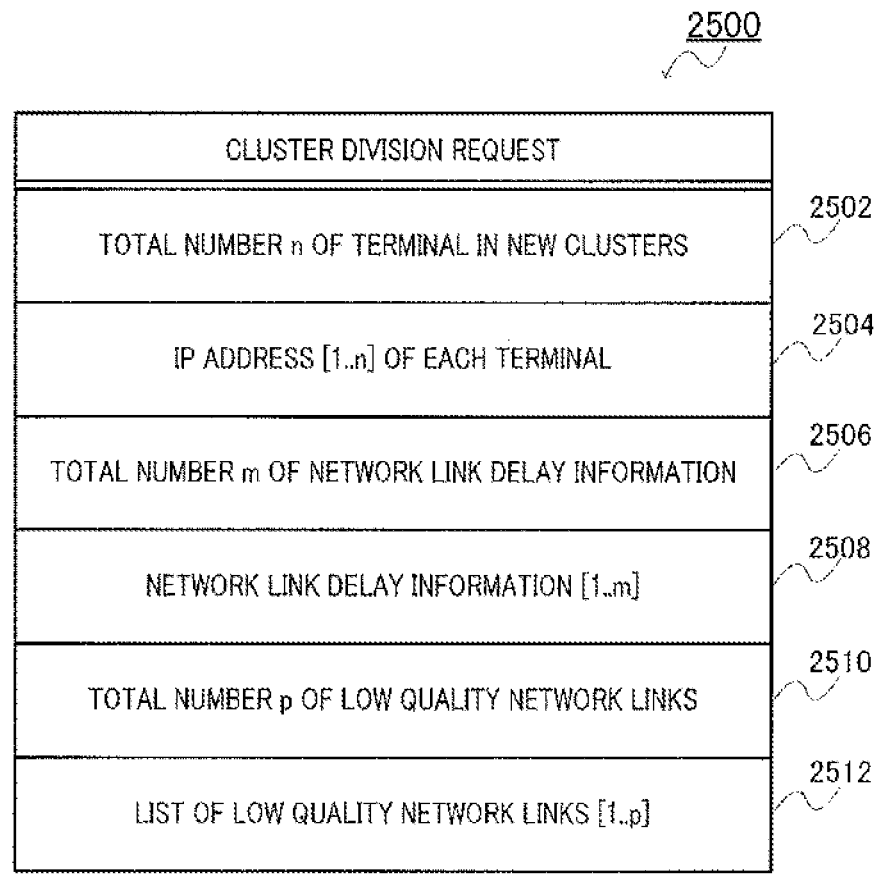
FIG. 12 shows an example of a configuration of a cluster division request according to the present embodiment.

FIG. 12 shows an example of a configuration of a cluster division request.

As shown in FIG. 12, cluster division request 2500 includes the total number (n) 2502 of communication terminals in a new cluster, and n IP addresses 2504 of communication terminals belonging to the new cluster. Cluster division request 2500 also includes the total number (m) of network link delay information 2506 in the new cluster, and the in pieces of network delay information 2508. Furthermore, cluster division request 2500 includes the total number (p) of low quality network links 2510 in the new cluster, and list of p low quality network links 2512.

Figure 13:
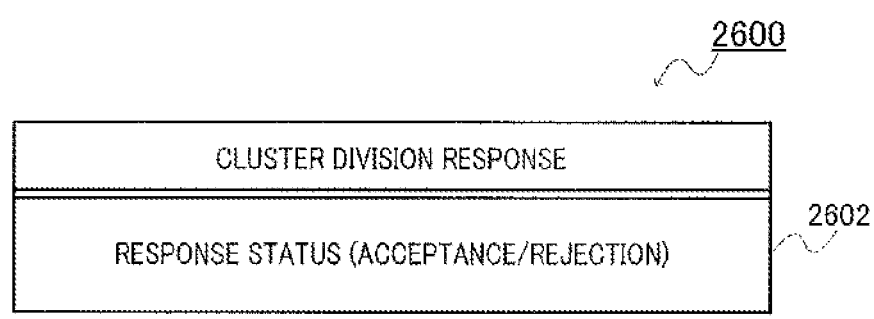
FIG. 13 shows an example of a configuration of a cluster division response according to the present embodiment.

FIG. 13 shows an example of a configuration of a cluster division response.

As shown in FIG. 13, cluster division response 2600 includes response status 2602 indicating one of "acceptance" and "rejection."

Figure 14:
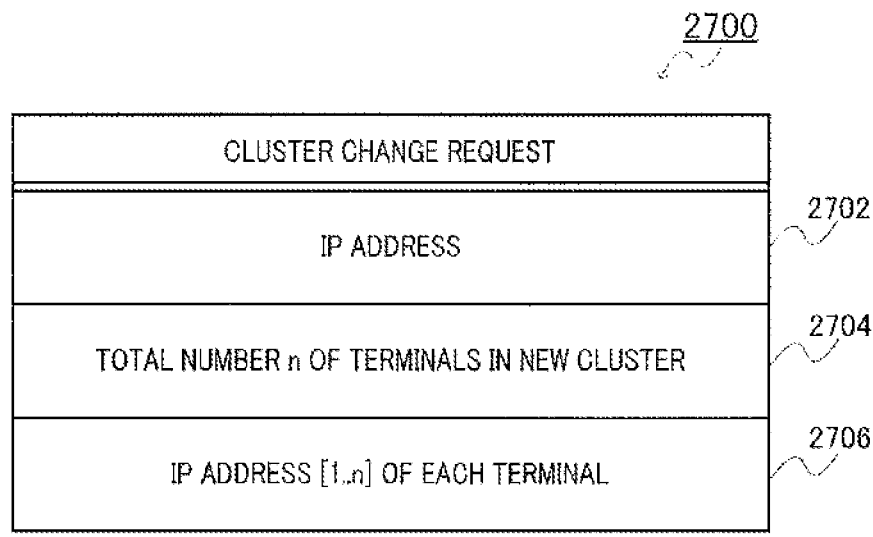
FIG. 14 shows an example of a configuration of a cluster change request according to the present embodiment.

FIG. 14 shows an example of a configuration of a cluster change request.

As shown in FIG. 14, cluster change request 2700 includes ID address 2702 of cluster monitoring terminal 430 that is the source of the request (that is, the target to report network quality information), and the total number (n) of communication terminals belonging to a new cluster 2704. Cluster change request 2700 includes n IP addresses 2706 of the communication terminals.

Figure 15:
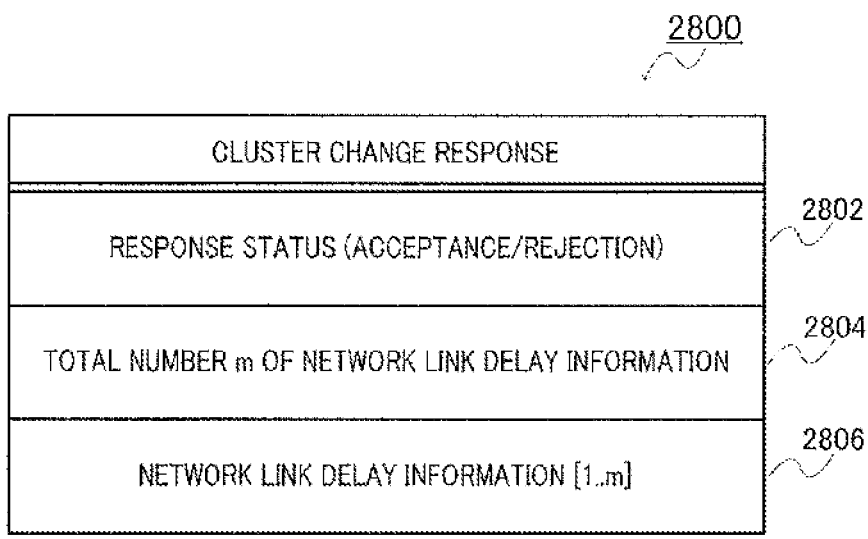
FIG. 15 shows an example of a configuration of a cluster change response according to the present embodiment.

FIG. 15 shows an example of a configuration of a cluster change response.

As shown in FIG. 15, cluster change response 2800 includes response status 2802 indicating one of "acceptance" and "rejection." Cluster change response 2800 also includes the total number (m) of network delay information 2804 measured for a new cluster, and m pieces of network delay information 2806.

Figure 16:
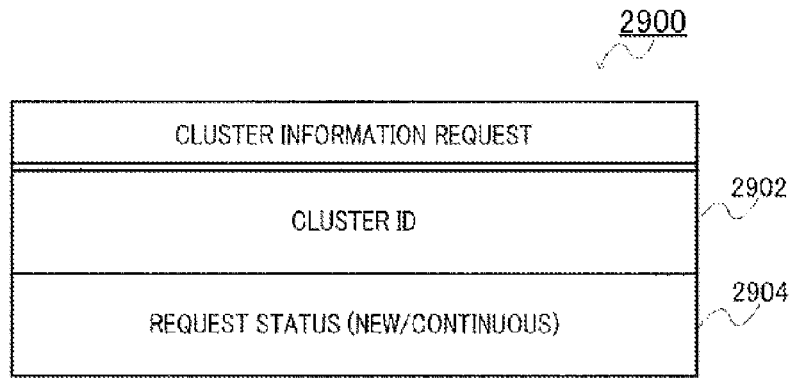
FIG. 16 shows an example of a configuration of a cluster information request according to the present embodiment.

FIG. 16 shows an example of a configuration of a cluster information request.

As shown in FIG. 16, cluster information request 2900 includes cluster ID 2902 of cluster monitoring terminal 430 that is the source of the request, and request status 2904 indicating one of "new" and "continuous."

Figure 17:
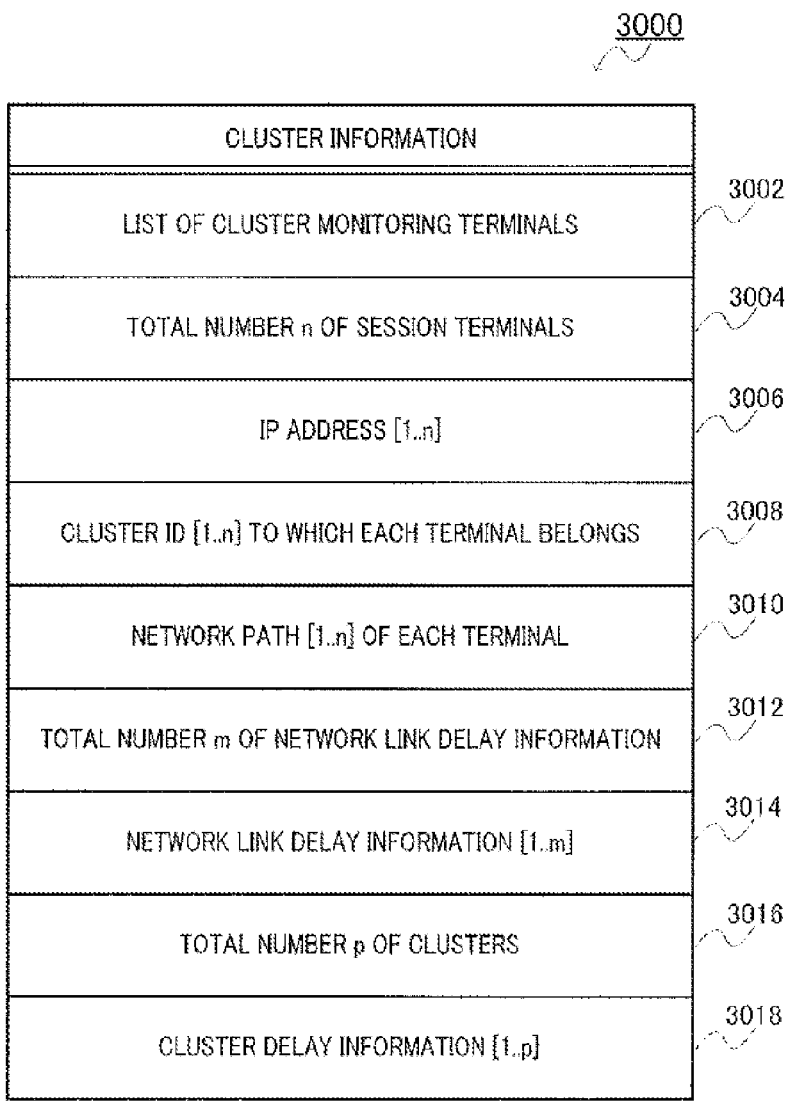
FIG. 17 shows an example of a configuration of cluster information according to the present embodiment.

FIG. 17 shows an example of a configuration of cluster information.

As shown in FIG. 17, cluster information 3000 includes list 3002 of cluster monitoring terminal 430, the total number (n) of communication terminals 3004 participating in a session and n IP addresses 3006 of communication terminals. Cluster information 3000 also includes cluster IDs 3008 to which n communication terminals belong respectively, and network paths 3010 of communication terminals. Cluster information 3000 includes the total number (m) of the network delay information 3012 in a session, and m pieces of network link delay information 3014. Cluster information 3000 includes the total number (p) of clusters 3016 in a session, and each piece of cluster delay information 3018 in the p clusters.

When only partial information per a cluster basis is requested, cluster information 3000 may be comprised only of the requested information. This corresponds to the above described partial cluster information.

Figure 18:
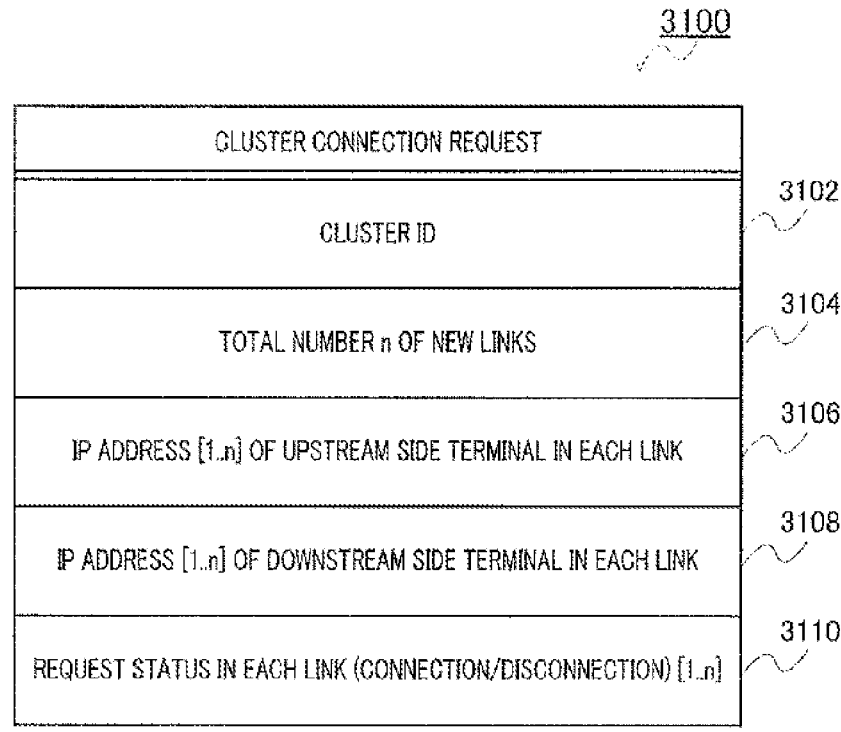
FIG. 18 shows an example of a configuration of a cluster connection request according to the present embodiment.

FIG. 18 shows an example of a configuration of a cluster connection request.

As shown in FIG. 18, cluster connection request 3100 includes cluster ID 3102 of cluster monitoring terminal 430 that is the source of the request, and the total number (n) of network links 3104 to be connected to a new child cluster (that is, a requested side cluster). Cluster connection request 3100 includes IP address 3106 of an upstream communication terminal and IP address 3108 of a downstream communication terminal in n network links. Cluster connection request 3100 includes request status 3110 indicating one of "connection" and "disconnection" per a network link basis. "Connection" status is the status to newly request a path connection. "Disconnection" status is the status to request disconnection of an existing path. The disconnection of a path is determined, for example, when a preferable cluster connection is present.

Figure 19:
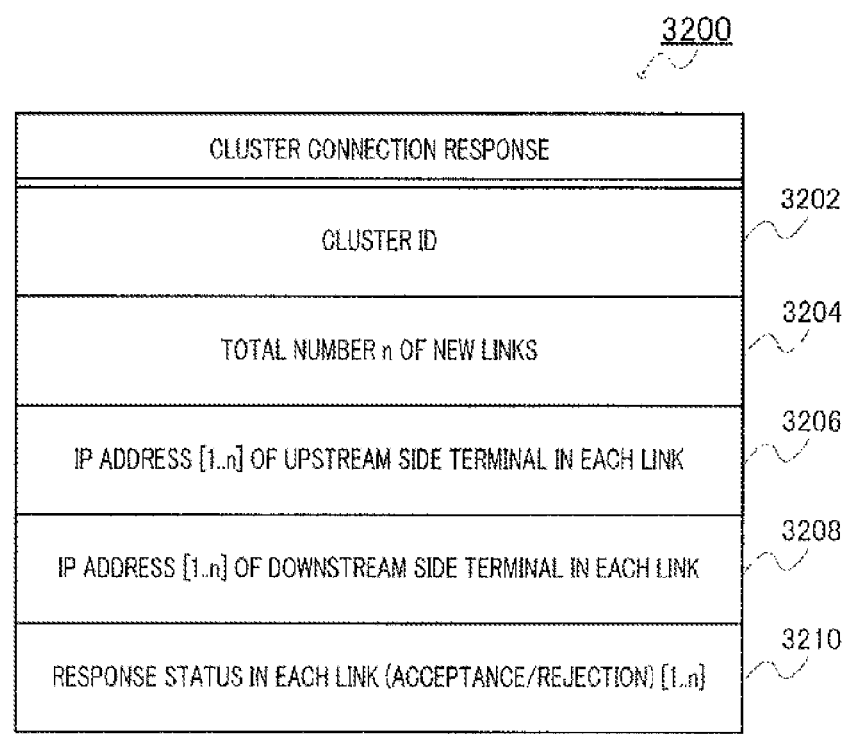
FIG. 19 shows an example of a configuration of a cluster connection response according to the present embodiment.

FIG. 19 shows an example of a configuration of a cluster connection response.

As shown in FIG. 19, cluster connection response 3200 includes cluster ID 3202 of cluster monitoring terminal 430 of the source of the response, and the total number (n) of network links 3204 to be connected to a new child cluster (that is, a requesting side cluster). Cluster connection request 3100 includes IP address 3206 of an upstream communication terminal and IP address 3208 of a downstream communication terminal, in n network links. Cluster connection request 3100 includes response status 3210 indicating one of "acceptance" and "rejection," per a network link basis.

Figure 20:
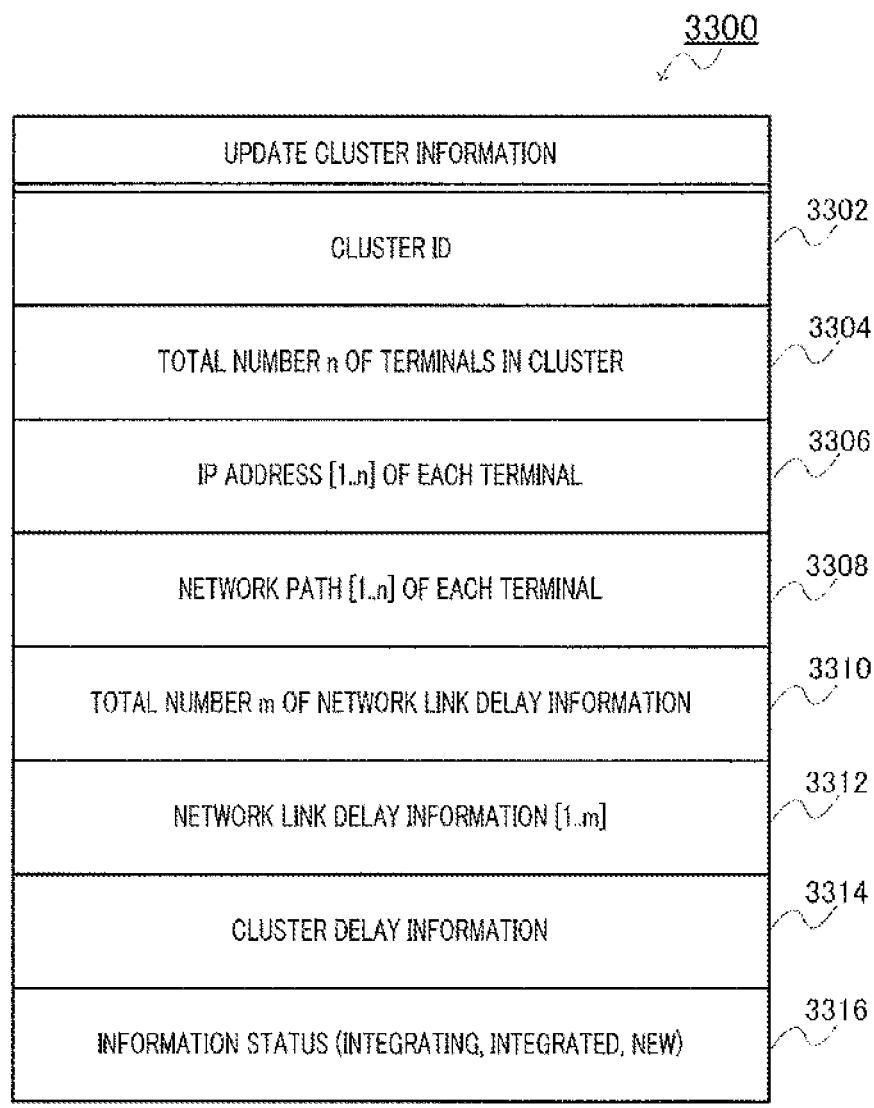
FIG. 20 shows an example of a configuration of update cluster information according to the present embodiment.

FIG. 20 shows an example of a configuration of update cluster information.

As shown in FIG. 20, update cluster information 3300 includes cluster ID 3302 of cluster monitoring terminal 430 of the transmission source, and the total number (n) of communication terminals 3304 belonging to a cluster that is the transmission source. Update cluster information 3300 also includes n IP addresses 3306 of communication terminals and network paths 3308 of the communication terminals. Update cluster information 3300 includes the total number (m) of network delay information 3310 in a cluster, and m pieces of network link delay information 3312. Update cluster information 3300 includes cluster delay information 3314, and information status 3316 indicating one of "integrating," "integrated," and "new."

Figure 21:
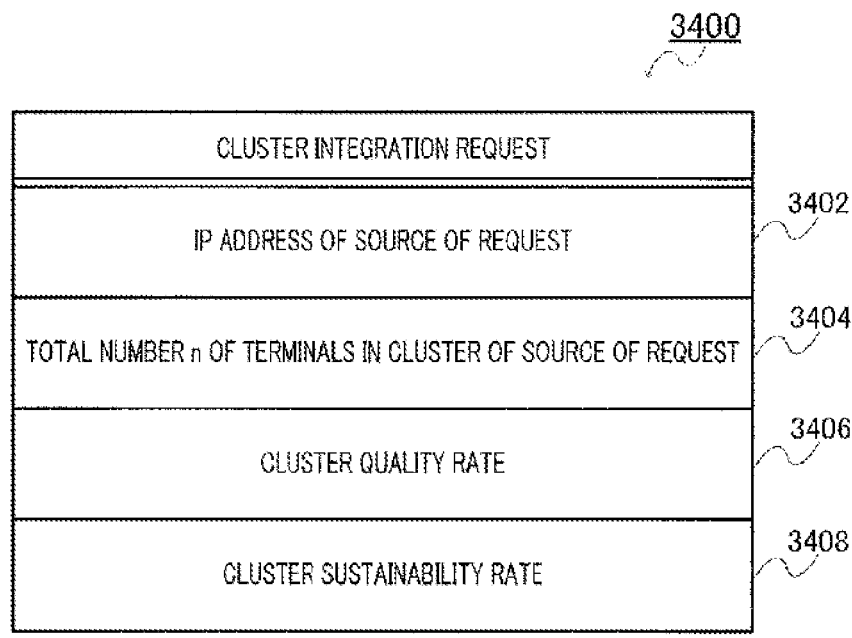
FIG. 21 shows an example of a configuration of a cluster integration request according to the present embodiment.

FIG. 21 shows an example of a configuration of a cluster integration request.

As shown in FIG. 21, cluster integration request 3400 includes cluster ID (IP address) 3402 of cluster monitoring terminal 430 that is the source of the request and the total number (n) of communication terminals 3404 in a cluster that is the source of the request. Cluster integration request 3400 includes cluster quality rate 3406 and cluster sustainability rate 3408 in a cluster that is the source of the request.

Figure 22:
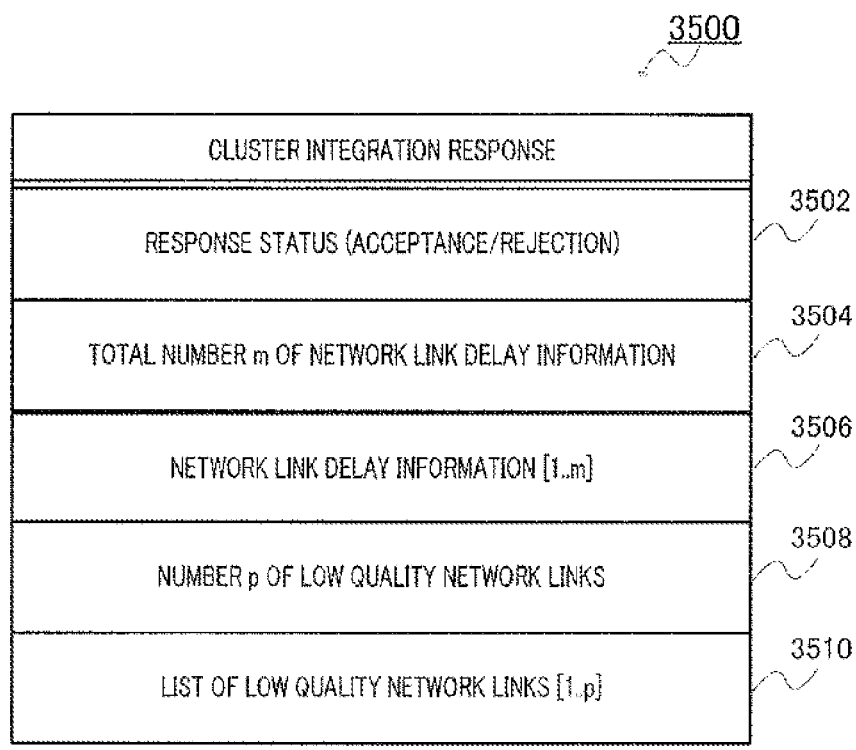
FIG. 22 shows an example of a configuration of a cluster integration response according to the present embodiment.

FIG. 22 shows an example of a configuration of a cluster integration response.

As shown in FIG. 22, cluster integration response 3500 includes response status 3502 indicating one of "acceptance" and "rejection." Cluster integration response 3500 includes the total number (m) of network delay information 3504 in a cluster to be integrated, and in pieces of network delay information 3506. Cluster integration response 3500 includes the number (p) of low quality network links 3508 and a list of p low quality network links 3510.

Next, the operation of cluster monitoring terminal 430 will be described.

Figure 23:
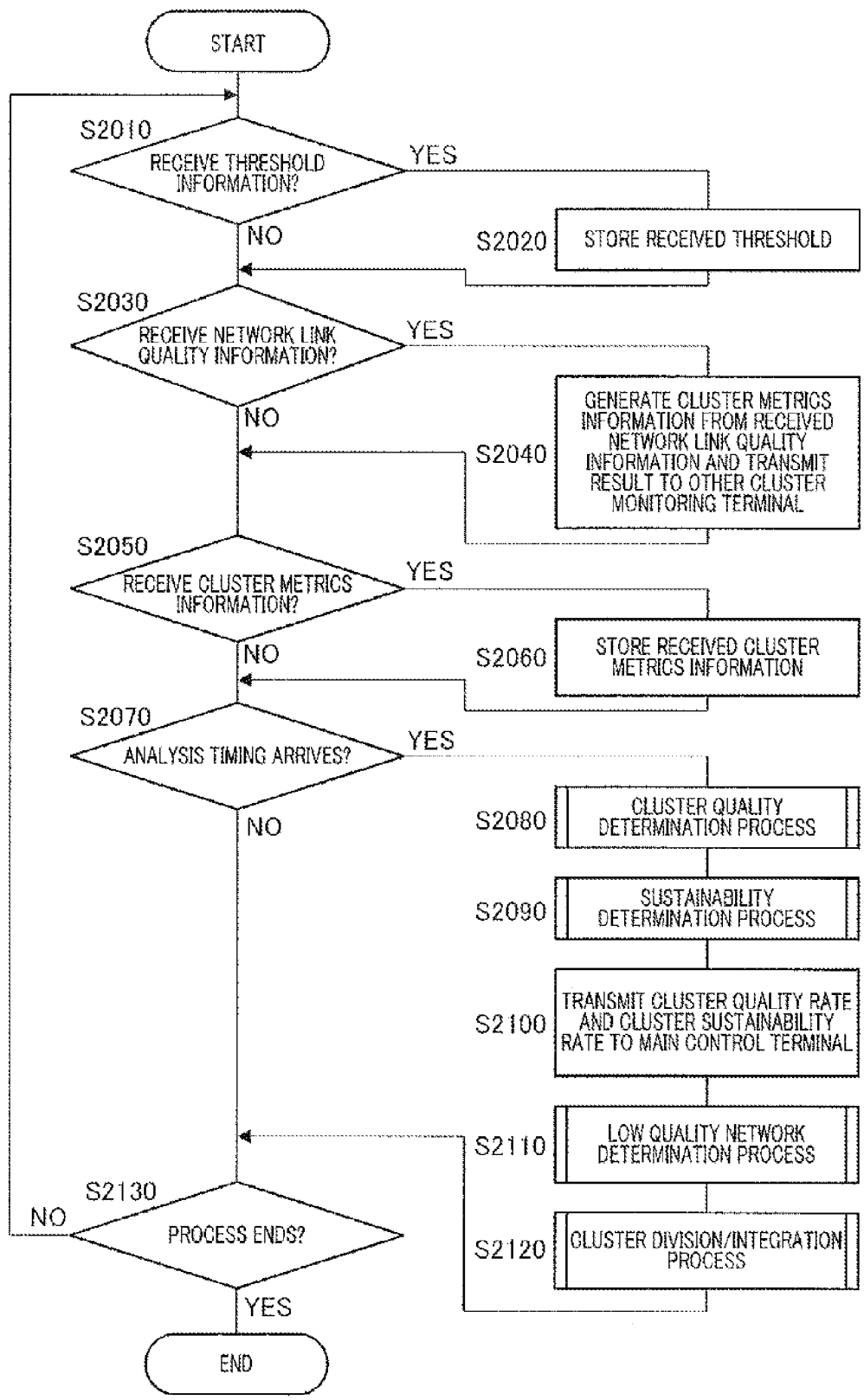
FIG. 23 is a flowchart showing an example of the operation of a cluster monitoring terminal according to the present embodiment.

FIG. 23 is a flowchart showing an example of the operation of cluster monitoring terminal 430.

First, in step S2010, cluster management section 431 determines whether or not to receive the threshold information (see FIG. 8) from main control terminal 420 (corresponding to step S508 and S510 in FIG. 5). When receiving the threshold information (S2010:YES), cluster management section 431 moves to step S2020. When not receiving the threshold information (S2010:NO), cluster management section 431 moves to the next step S2030.

In step S2020, cluster management section 431 stores the received threshold information into cluster metrics database 435 and moves to step S2030.

In step S2030, cluster management section 431 acquires the network link quality information (see FIG. 9) from stream transfer terminal 410 of a local cluster. Cluster management section 431 determines whether or not to receive all network link quality information (see FIG. 9) necessary to generate the cluster metrics information (corresponding to step S512 and S514 in FIG. 5). When receiving all network link quality information (S2030:YES), cluster management section 431 outputs all received network link quality information to cluster quality calculation section 432. Cluster management section 431 moves to step S2040. When not receiving all network link quality information (S2030:NO), cluster management section 431 moves to the next step S2050.

In step S2040, cluster quality calculation section 432 specifics a low quality network link, from the input network link quality information. Cluster quality calculation section 432 generates cluster metrics information (see FIG. 10) including a list of the low quality network link and the number of low loss links. Cluster quality calculation section 432 transmits the generated cluster metrics information to other cluster management terminal via cluster management section 431 (corresponding to step S516 in FIG. 5), and moves to step S2050.

In step S2050, cluster management section 431 determines whether or not to receive all cluster metrics information necessary for the analysis of cluster division/integration, from other cluster monitoring terminal. Here, all cluster metrics information means the cluster metrics information generated for all clusters (hereinafter, referred to as "path cluster") in upstream and downstream clusters. When receiving all cluster metrics information (S2050:YES), cluster management section 431 moves to step S2060, and stores the received cluster metrics information. When not receiving all cluster metrics information (S2050:NO), cluster management section 431 moves to the next step S2070.

In step S2070, cluster management section 431 determines whether or not the timing to analyze the cluster division/integration arrives. This timing may be, for example, the timing when the acquisition of the above described all network link quality information and all cluster metrics information is completed, or the timing when a predetermined time from the previous analysis elapses.

Specifically, for example, cluster management section 431 of each cluster monitoring terminal 430 may analyze the cluster division/integration at different timings per a cluster basis. In this case, cluster management section 431 forms a periodical analysis timing according to a timer, and collects all necessary information (network link quality information and cluster metrics information) per the period. Any value can be set to the period length according to the system design. When the period is short, the cluster division/integration is frequently performed, which results in frequently changing a network relay path. When the period is short, the cluster division/integration is determined based on a packet loss rate in a longer duration. When information collection is periodically performed as above, it is not necessary to perform a sequential determination of whether or not all information is collected.

When the timing to analyze cluster division/integration arrives (S2070:YES), cluster management section 431 moves to step S2080. In this case, cluster management section 431 outputs network link quality information (see FIG. 9) and cluster metrics information (see FIG. 10) to cluster sustainability calculation section 433 and cluster quality calculation section 432, respectively. Then, when the timing has not arrived yet (S2070:NO), cluster management section 431 moves to step S2130 described later.

In step S2080, duster quality calculation section 432 performs a cluster quality determination process calculating a cluster quality rate (corresponding to step S1020 in FIG. 4). In following step S2090, cluster sustainability calculation section 433 performs a sustainability determination process calculating a sustainability rate (corresponding to step S1030 in FIG. 4). As a result, cluster division/integration analysis section 434 receives as inputs the cluster quality rate and cluster sustainability rate of a local cluster of cluster monitoring terminal 430. The details of these processes will be described later.

In step S2100, cluster division/integration analysis section 434 transmits the sustainability information (see FIG. 11) to main control terminal 420 via cluster management section 431 (corresponding to step S518 and S520 in FIG. 5). This sustainability information includes the cluster quality rate and cluster sustainability rate of a cluster.

In step S2110, cluster quality calculation section 432 performs a low quality network determination process to determine a low quality network (corresponding to step S1040 in FIG. 4). In following step S2120, cluster division/integration analysis section 434 performs a cluster division/integration process (corresponding to step S1050 and S1060 in FIG. 4), and moves to step S2130. This cluster division/integration process is the process to determine cluster division/integration. As a result, cluster division/integration is appropriately performed. The details of these processes will be described later.

Figure 24:
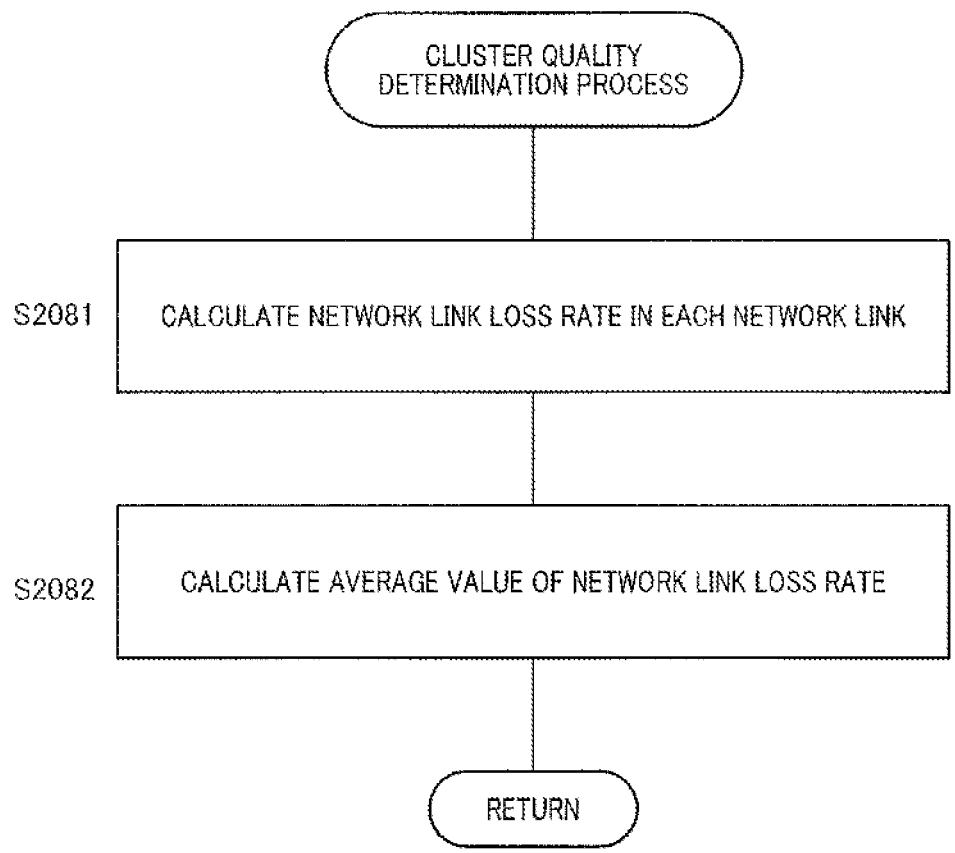
FIG. 24 is a flowchart showing an example of the detail of a cluster quality determination process according to the present embodiment.

FIG. 24 is a flowchart showing an example of a cluster quality determination process (step S2080).

In step S2081, cluster quality calculation section 432 collects network link quality information (see FIG. 9) from all stream transfer terminals 410 of a local cluster. Cluster quality calculation section 432 calculates a ratio (that is, a network link loss rate) of the number of lost packets to the number of transmission packets per a network link.

In step S2082, cluster quality calculation section 432 calculates the value obtained by subtracting 1 from the average of all network link loss rates in a cluster, as a cluster quality rate. Cluster quality calculation section 432 outputs the calculated cluster quality rate to cluster division/integration analysis section 434.

Figure 25:
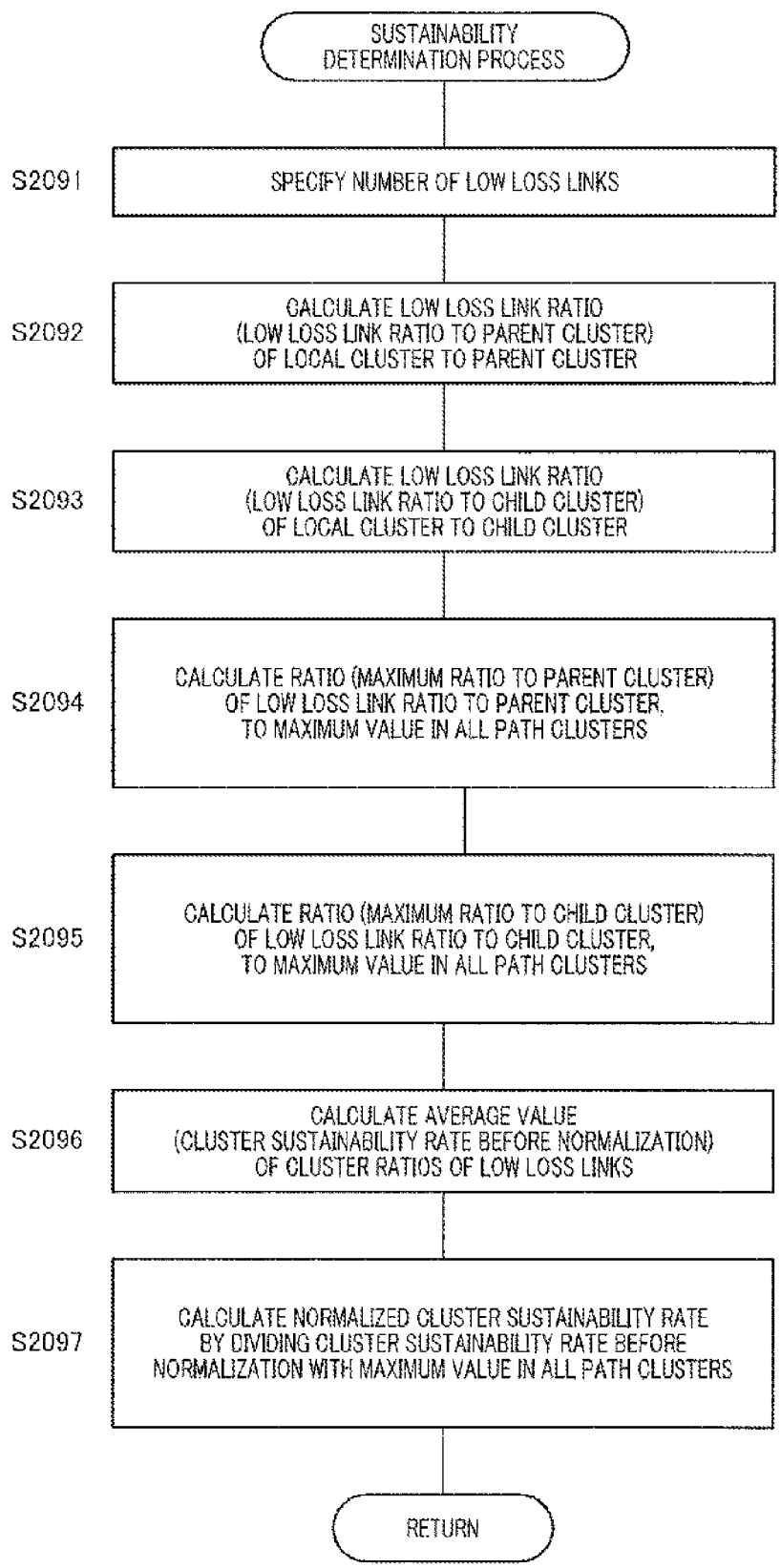
FIG. 25 is a flowchart showing an example of the detail of a sustainability determination process according to the present embodiment.
Figure 26:
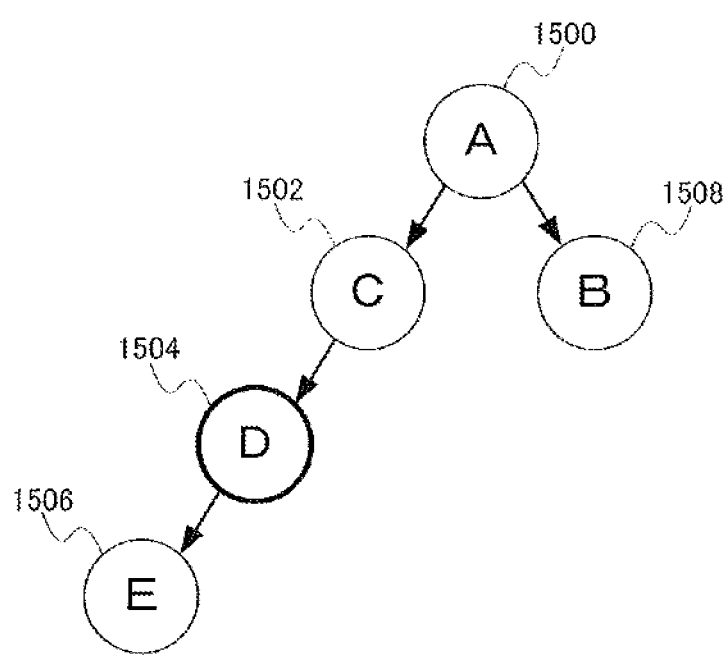
FIG. 26 shows a cluster relationship used as an example for explaining a sustainability determination process according to the present embodiment.

FIG. 25 is a flowchart showing an example of the detail of a sustainability determination process (step S2090). FIG. 26 shows the relationship between clusters used as an example for the explanation of a sustainability determination process.

In step S2091, cluster sustainability calculation section 433 specifies the number of low loss links in a local cluster (S2091). That is, cluster sustainability calculation section 433 specifies the number of the low loss links, based on the information of the network link loss rate that is received at step S2030 in FIG. 23 and included in the network link quality information (see FIG. 9).

In step S2092, cluster sustainability calculation section 433 acquires the number of low loss links in a path cluster, from cluster metrics information (see FIG. 10) received at step S2050 in FIG. 23. Per a path cluster, cluster sustainability calculation section 433 calculates a ratio (hereinafter, referred to as "low loss link ratio to a parent cluster") of a difference in the number of low loss links between a parent cluster and a local cluster, to the number of low loss links of a parent cluster. However, the most upstream cluster that does not include a parent cluster is eliminated. Here, when assuming that $Z_i$ is the number of low loss links of a local cluster and $Z_p$ is the number of low loss links of a parent cluster, low loss link ratio $a_i$ to a parent cluster is shown as following equation 1.

$$a_i = \Delta(Z_p, Z_i)/Z_p = (Z_p - Z_i)/Z_p \quad \text{(Equation 1)}$$

Here, as shown in FIG. 26, it is assumed that the relationship among clusters is from cluster A to cluster E (1500 to 1508) with cluster A at the top. Cluster C is a parent cluster of cluster D, and cluster E is a child cluster of cluster D. Cluster A and cluster C are upstream clusters of cluster D, and cluster E is a downstream cluster of cluster D. Meanwhile, since cluster B has no communication terminal connected to clusters C, D, and E, cluster B is not an upstream cluster of clusters C, D, and E. However, cluster B is a child cluster of cluster A and a downstream cluster.

In this case, for example, low loss link ratio $a_D$ to a parent cluster of cluster D is calculated by following equation 2. In equation 2, it is assumed that $Z_C$ is the number of low loss links in cluster C and $Z_D$ is the number of low loss links in cluster D.

$$a_D = \Delta(Z_C, Z_D)/Z_C = (Z_C - Z_D)/Z_C \quad \text{(Equation 2)}$$

In step S2093, per a path cluster basis, cluster sustainability calculation section 433 calculates a ratio of a difference in the number of low loss links between a local cluster and a child cluster, to the number of low loss links of a local cluster. Hereinafter, the ratio of the difference in the number of low loss links between a local cluster and a child cluster, to the number of low loss links of a local cluster, is referred to as "low loss link ratio to a child cluster." However, the most downstream cluster that does not include a child cluster is eliminated. Here, when assuming that $Z_C$ is the number of low loss links of a child cluster, low loss link ratio $b_i$ to a child cluster is shown in following equation 3.

$$b_i = \Delta(Z_c, Z_i)/Z_i = (Z_i - Z_c)/Z_i \quad \text{(Equation 3)}$$

The reason for applying not only the low loss link ratio $a_i$ to a parent cluster to the cluster sustainability rate, but also the low loss link ratio $b_i$ to a child cluster thereto is to realize uniformly high cluster sustainability in all clusters. Also, this is because it is preferable to suppress execution of cluster division/integration at requisite minimum, from view point of quality assurance of an AV stream.

For example, when not only a local cluster but also other cluster is connected to a child cluster as a parent cluster, the number of low loss links of the child cluster may be smaller. Therefore, it is possible to acquire an index value of capability to accept participation of a new communication terminal based on the whole session, by comparing not only with an upstream side but also with a downstream side. By making the whole session as a basis, it is possible to accurately extract cluster division/integration having high priority, and therefore to suppress execution of cluster division/integration at requisite minimum.

For example, in an example of FIG. 26, it is assumed that $Z_E$ is the number of low loss links in cluster E. In this case, for example, low loss link ratio $b_D$ to a child cluster of cluster D is calculated by following equation 4.

$$b_D = \Delta(Z_E, Z_D)/Z_D = (Z_D - Z_E)/Z_D \quad \text{(Equation 4)}$$

In step S2094, cluster sustainability calculation section 433 calculates a ratio (hereinafter, referred to as "maximum value ratio to a parent cluster") to a maximum value among all low loss link ratios to parent clusters of a path cluster. When assuming that the maximum value among all low loss link ratios to parent clusters of a path cluster is Max ($\{a_j\}$), maximum value ratio $c_i$ to a parent cluster is shown in following equation 5.

$$c_i = a_i/\text{Max}(\{a_j\}) \quad \text{(Equation 5)}$$

For example, in an example of FIG. 26, maximum value ratio $c_D$ to a parent cluster of cluster D is shown in following equation 6.

$$c_D = a_D/\text{Max}(a_A, a_C, a_D, a_E) \quad \text{(Equation 6)}$$

In step S2095, cluster sustainability calculation section 433 calculates a ratio (hereinafter, referred to as "maximum value ratio to a child cluster") to a maximum value among all low loss link ratios to child clusters of a path cluster. When assuming that the maximum value among all low loss link ratios to child clusters of a path cluster is Max ($\{b_j\}$), maximum value ratio $d_i$ to a child cluster is shown in following equation 7.

$$d_i = b_i/\text{Max}(\{b_j\}) \quad \text{(Equation 7)}$$

For example, in an example of FIG. 26, maximum value ratio $d_D$ to a child cluster of cluster D is calculated in following equation 8.

$$d_D = b_D/\text{Max}(b_A, b_C, b_D, b_E) \quad \text{(Equation 8)}$$

In step S2096, per each path cluster, cluster sustainability calculation section 433 calculates the average value of maximum value ratio $c_i$ to a parent cluster and the maximum value ratio $d_i$ to a child cluster, as a cluster sustainability ratio before normalization. That is, cluster sustainability rate $e_i$ before normalization is shown in following equation 9.

$$e_i = (c_i + d_i)/2 \quad \text{(Equation 9)}$$

By assuming that the number of child clusters is n when a plurality of child clusters are present, low loss link ratio $a_i$ to a parent cluster and low loss link ratio $b_i$ to a child cluster are shown in following equation 10 and equation 11, respectively.

$$a_i = [(Z_{p1} - Z_i)/Z_{p1}] + \ldots + [(Z_{pn} - Z_i)/Z_{pn}] \quad \text{(Equation 10)}$$

$$b_i = [(Z_i - Z_{c1})/Z_i] + \ldots + [(Z_i - Z_{cm})/Z_i] \quad \text{(Equation 11)}$$

In step S2097, cluster sustainability calculation section 433 eliminates the cluster sustainability rate before normalization of the local cluster, with a maximum value among all cluster sustainability rates before normalization of a path cluster. By this means, cluster sustainability calculation section 433 calculates a normalized cluster sustainability rate. That is, cluster sustainability rate $f_i$ is shown in following equation 12.

$$f_i = e_i/(e_i + \max(e_j)) \quad \text{(Equation 12)}$$

Figure 27:
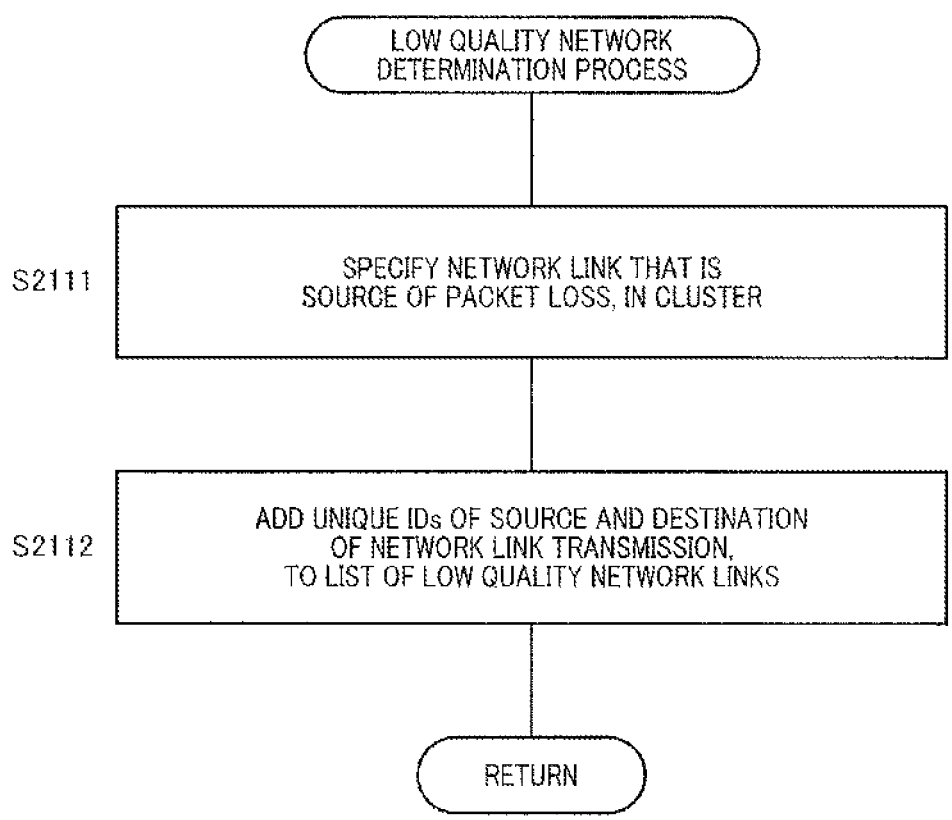
FIG. 27 is a flowchart showing the detail of a low quality network determination process according to the present embodiment.

FIG. 27 is a flowchart showing the detail of a low quality network determination process (step S2110).

In step S2111, cluster quality calculation section 432 specifies a network link (that is, a low quality network link) that is the source of packet loss, on a stream relay path in a local cluster. It is possible to specify the source of packet loss, by monitoring a packet loss rate of each network link, based on network link information and a tree based stream relay path.

In step S2112, cluster quality calculation section 432 creates a list of low quality network links, and outputs the created list to cluster division/integration analysis section 434. Specifically, cluster quality calculation section 432 specifies two stream transfer terminals 410 to which the network link that is the source of packet loss is connected at upstream side and downstream side. Cluster quality calculation section 432 makes a list of identification information (IP address or the like) of two specified stream transfer terminals 410 as a low quality network link.

Figure 28:
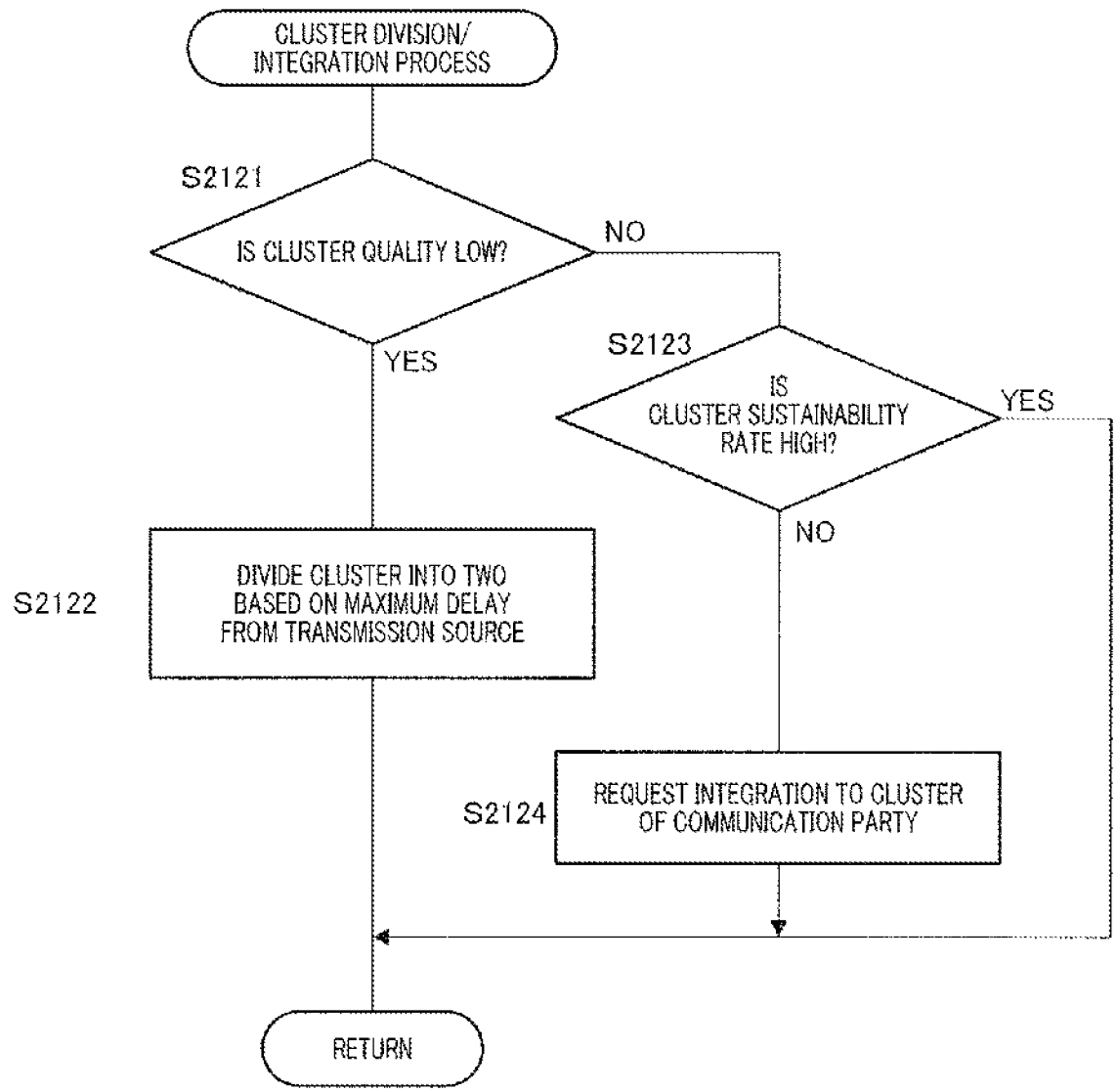
FIG. 28 is a flowchart showing the detail of a cluster division/integration process according to the present embodiment.

FIG. 28 is a flowchart showing the detail of a cluster division/integration process (step S2120).

In step S2121, cluster division/integration analysis section 434 determines whether or not the cluster quality of a local cluster is low. Specifically, cluster division/integration analysis section 434 compares the cluster quality rate calculated at step S2080 in FIG. 23, with the cluster quality threshold acquired at step S2010 in FIG. 23. Cluster division/integration analysis section 434 determines whether or not the cluster quality rate is equal to or higher than the cluster quality threshold. When the cluster quality of a local cluster is low (S2121:YES), cluster division/integration analysis section 434 moves to step S2122. When the cluster quality of a local cluster is not low (S2121:NO), cluster division/integration analysis section 434 moves to step S2123.

In step S2122, cluster division/integration analysis section 434 divides a local cluster into two, based on for example, maximum delay from a route terminal to each stream transfer terminal 410.

For example, it is assume that nodes A to F belong to a local cluster, and the delay time from nodes A to F route terminals is shorter in this order. In this case, for example, a pattern to divide a cluster into nodes A to C having a shorter delay time and nodes D to F having a longer delay time is considerable. For example, a pattern to divide a cluster into nodes A, C, and E and nodes B, D, and F, by mixing a node having a shorter delay time and a node having a longer delay time, is also considerable.

According to a cluster that the division newly generates, cluster division/integration analysis section 434 determines cluster monitoring terminal 430, and transmits a cluster division request (see FIG. 12) (corresponding to step S540 in FIG. 6). When a cluster division request is accepted, cluster division/integration analysis section 434 transmits cluster change request (see FIG. 14) information to each stream transfer terminal 410 (corresponding to step S544 in FIG. 6). As described above, this cluster change request defines a new cluster and a new cluster monitoring terminal. Cluster division/integration analysis section 434 moves to step S2130 in FIG. 23.

In step S2123, cluster division/integration analysis section 434 determines whether or not the cluster sustainability rate of a local cluster is high. Specifically, cluster division/integration analysis section 434 compares the cluster sustainability calculated at step S2090 of FIG. 23 with the cluster sustainability threshold acquired at step S2010 of FIG. 23. Cluster division/integration analysis section 434 determines whether or not the cluster sustainability is equal to or higher than the cluster sustainability threshold. When the cluster sustainability quality of a local cluster is not high (S2123: NO), cluster division/integration analysis section 434 moves to step S2124. When the cluster sustainability quality of a local cluster is high (S2123:YES), cluster division/integration analysis section 434 moves to step S2130 in, FIG. 23.

In step S2124, cluster division/integration analysis section 434 transmits a cluster integration request (see FIG. 21) to cluster monitoring terminal 430 that is an integrated party (corresponding to step S570 in FIG. 7). When the cluster integration request is accepted, cluster division/integration analysis section 434 transmits a cluster change request (see FIG. 14) to each stream transfer terminal 410 (corresponding to step S574 in FIG. 7). This cluster change request defines an integrated cluster and a cluster monitoring terminal, as described above. Cluster division/integration analysis section 434 moves to step S2130 in FIG. 23.

Figure 29:
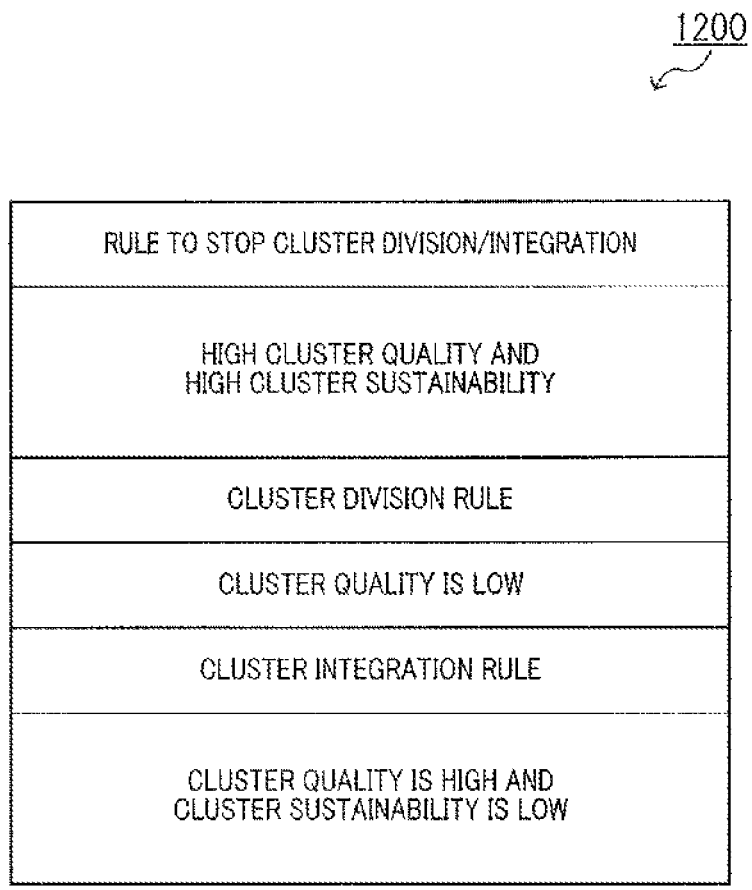
FIG. 29 shows a rule of a cluster division/integration process according to the present embodiment.

Cluster division/integration determination rule 1200 in this cluster division/integration process is as shown in FIG. 29.

That is, the rule to stop dividing or integrating a cluster requires that both cluster quality and cluster sustainability are high (that is, a packet loss rate is low and the number of low loss links is large). This is because such a cluster may be capable of being a candidate to accept a participant terminal.

The rule to divide a cluster is that the cluster quality is low (that is, the packet loss rate is high).

The rule to perform cluster integration is that the cluster quality is high, and the cluster sustainability is low (that is, the packet loss rate is low, and the number of low loss links is small).

The rule of rejection at a cluster integration process is, for example, as follows. It is assumed that a cluster integration request is transmitted to all cluster monitoring terminals 430. Cluster monitoring terminal 430 having received a cluster integration request accepts the cluster integration request when having determined the cluster integration. However, cluster monitoring terminal 430 rejects the cluster integration request, when falling into at least one of the following conditions.

(1) In case where a cluster of cluster monitoring terminal 430 is not the cluster that should be a target of the cluster integration request. The cluster that is not a target of a cluster integration request means, for example, the cluster having high cluster quality and high cluster sustainability.

(2) In case where a cluster of cluster monitoring terminal 430 is in the middle of integration with other cluster.

(3) In case where the elapsed time from when the final cluster division/integration is performed to the cluster of cluster monitoring terminal 430, does not reach to a predetermined threshold. This threshold is the value determined in advance as an interval to perform cluster division/integration in order to prevent the degradation of streaming quality according to frequent cluster division/integration.

The rule to reject in cluster division is applied, for example, when the cluster quality of a local cluster is low.

By this means, after cluster division/integration is performed, a path construction process between clusters is performed. In the case of cluster division, new cluster monitoring terminal 430 and cluster monitoring terminal 430 that is the source of a division request, perform the path construction process between clusters for each cluster. In the case of cluster integration, only cluster monitoring terminal 430 that is the source of an integration request performs the path construction process between clusters.

Figure 30:
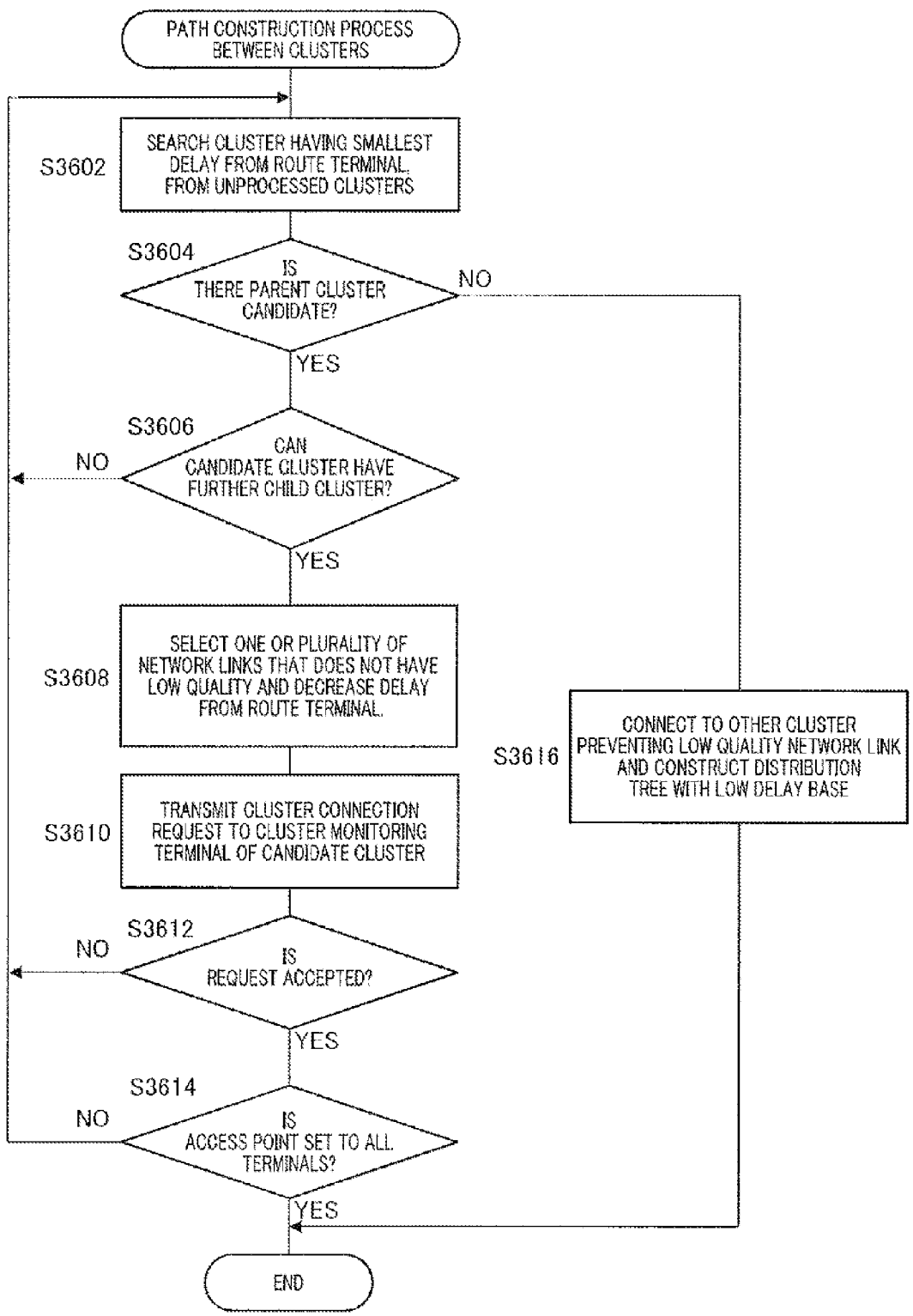
FIG. 30 is a flowchart showing the detail of a path construction process among clusters according to the present embodiment.

FIG. 30 is a flowchart showing an example of the path construction process between clusters. A path construction process between clusters is performed by, for example, cluster management section 431 of cluster monitoring terminal 430.

First, based on the cluster information, cluster monitoring terminal 430 searches a cluster where the delay from a route terminal is the smallest, from clusters that are not yet treated as a parent cluster candidates (S3602). This cluster to be searched is a candidate of a parent cluster. When a candidate (hereinafter, referred to as "candidate cluster") of a parent cluster is present (S3604:YES), cluster monitoring terminal 430 determines whether or not the candidate cluster can have further child cluster (S3606). That is, cluster monitoring terminal 430 determines whether or not the current number of child clusters of a candidate cluster is equal to or lower than a predetermined maximum value. This maximum value is determined based on, for example, the maximum size of a stream relayed through a cluster.

When a candidate cluster cannot have further child cluster (S3606:NO), cluster monitoring terminal 430 returns to step S3602 and searches other candidate cluster. When the candidate cluster can have further child cluster (S3606:YES), cluster monitoring terminal 430 moves to step S3608. Cluster monitoring terminal 430 selects one or a plurality of network links that connect a communication terminal of the candidate cluster and a communication terminal in the local cluster (S3608). In this case, cluster monitoring terminal 430 selects a network link having not low quality and less delay from a route terminal.

Cluster monitoring terminal 430 transmits a cluster connection request (see FIG. 18) to a cluster monitoring terminal of a candidate cluster (S3610). When this cluster connection request is accepted, cluster monitoring terminal 430 of a candidate cluster sets the network link selected by cluster monitoring terminal 430 that is the source of the request.

As described above, cluster division and cluster integration may be simultaneously performed in parallel, in one session. Therefore, a plurality of cluster connection requests from a plurality of cluster monitoring terminals 430 may be transmitted to one cluster monitoring terminal 430. When the number of child clusters exceeds a predetermined maximum value, a candidate cluster having received a cluster connection request rejects the cluster connection request that exceeds the predetermined maximum value. For example, a candidate cluster may select a cluster in order of request arrival, and preferentially select a cluster that has less delay from a route terminal.

When the transmitted cluster connection request is rejected (S3612:NO), cluster monitoring terminal 430 returns to step S3602 and searches other candidate cluster. Meanwhile, when the transmitted cluster connection request is accepted (S3612:YES), cluster monitoring terminal 430 moves to step S3614. Cluster monitoring terminal 430 determines whether or not access points (a directly connected upstream communication terminal and parent terminal) are set to all communication terminals in a local cluster (S3614).

When a communication terminal where an access point is not set remains (S3614:NO), cluster monitoring terminal 430 returns to step S3602 and searches other candidate cluster. Meanwhile, when access points are set to all communication terminals in a cluster (S3614:YES), cluster monitoring terminal 430 terminates a series of the processes.

On the other hand, when cluster monitoring terminal 430 determines that a candidate cluster is not present, before the access points are set to all communication terminals in a cluster (S3604:NO), cluster monitoring terminal 430 moves to step S3616. Cluster monitoring terminal 430 constructs a stream relay path (distribution tree) with low delay base, and terminates the process (S3616). In this case, a cluster monitoring terminal connects a communication terminal to which an access point is set, to a communication terminal where an access point has been set in a local cluster, to prevent a low quality network link.

By means of this process, for example, when a communication terminal where a connection is rejected from a certain candidate cluster is present, cluster monitoring terminal 430 requests to the next candidate cluster, a connection of the communication terminal. As for a communication terminal incapable of directly connecting to other cluster, cluster monitoring terminal 430 indirectly connects to other cluster via a communication terminal capable of directly connecting to other cluster.

By means of the above-described operation, stream transfer terminal 410 can determine cluster integration, based on a relative relationship of cluster sustainability between an upstream cluster and a downstream cluster. More specifically, stream transfer terminal 410 can determine to integrate a cluster with other cluster, the cluster having a small difference in the number of low loss links between an upstream cluster and a downstream cluster and having a low network quality. Stream transfer terminal 410 can also determine to divide a cluster having low network quality.

It is said that the low loss link is a rich resource capable of arranging more stream transfer terminals 410 to downstream, and duplicating and relaying an AV content. Therefore, as compared to a parent cluster and a child cluster, a cluster formed with more low loss links is a cluster with high sustainability having room to accept a participant terminal.

The sustainability of each cluster needs to be maintained higher than a predetermined level, in order to guarantee scalability to accept a participant terminal.

By integrating a plurality of clusters, an integrated cluster becomes a cluster with high sustainability having room to accept a participant terminal.

Thus, as described above, each cluster monitoring terminal 430 uses a cluster sustainability rate indicating the relative number of low loss links in a stream relay path and a cluster sustainability threshold set for each session. Each cluster monitoring terminal 430 determines integration with a parent cluster or a child cluster, with respect to a cluster where the cluster sustainability rate is equal to or lower than the cluster sustainability threshold. By this means, network system 100 can maintain the sustainability of each cluster at a higher state than a predetermined level, and therefore can flexibly accept a participant terminal.

Cluster monitoring terminal 430 determines to divide a cluster where individual pieces of cluster quality is low. A high packet loss rate is the result of the change of a network state. According to the above network link division, network system 100 can form a cluster having the decreased number of stream transfer terminals 410. That is, network system 100 can reset a stream relay path to decrease the number of targets where each stream transfer terminal 410 relays. By this means, a network load of a network link having a high packet loss rate decreases, and therefore the network link loss rate decreases.

Hereinafter, an example of cluster division/integration in network system 100 will be described. Here, it is assumed that a session configuration and a cluster configuration in an initial state are as shown in FIG. 2.

As described above, network links 306, 310, 312, 320, and 326 have high packet loss rates. Here, it is assumed that network link 306 is specified as the source to lose a packet loss among stream relay paths (nodes a to h, and nodes a to i). In this case, according to cluster monitoring terminals 430, network links 306, 320, and 326 are specified and listed as low quality network links. For the next stream relay path reconstruction, these network links will be treated as a path with low priority.

Figure 31:
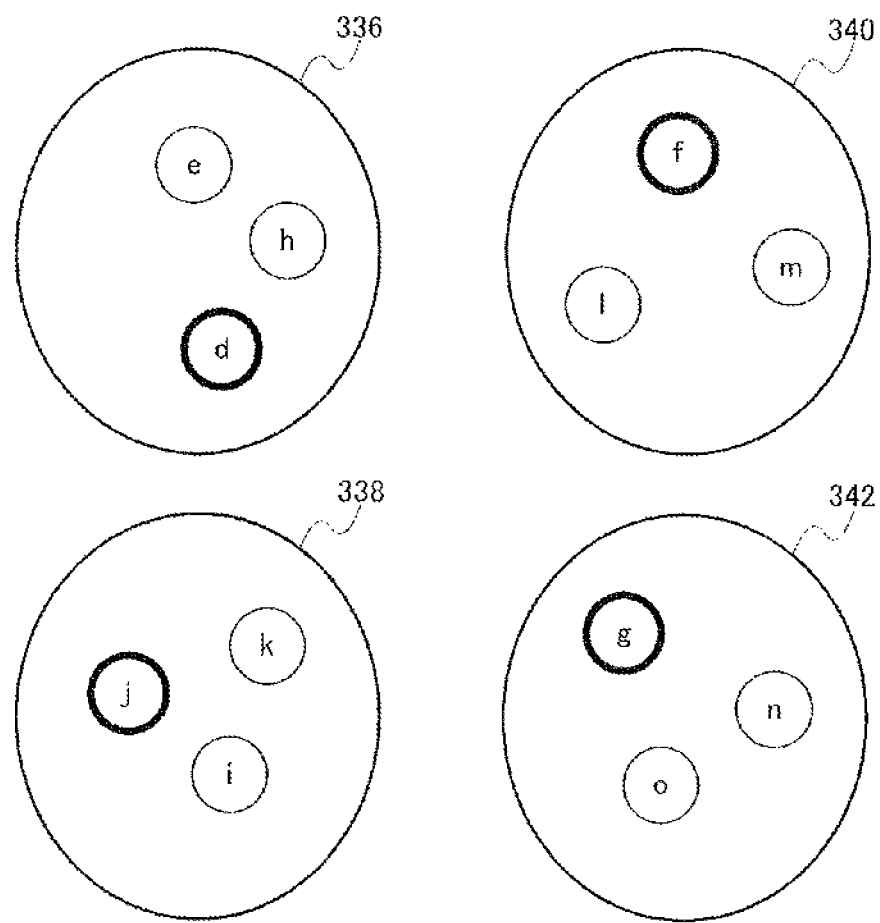
FIG. 31 shows an example of a state where cluster division is performed according to the present embodiment.

In this case, network system 100 divides second cluster 332 and third cluster 334 including a large number of low quality network links, respectively. For example, as shown in FIG. 31, network system 100 divides, second cluster 332 into forth cluster 336 and fifth cluster 338, and third cluster 334 into sixth cluster 340 and seventh cluster 342, respectively.

It is assumed that divided fifth cluster 338 and seventh cluster 342 have low cluster quality (high cluster quality rate) and high cluster sustainability (high cluster sustainability rate). In this case, for example, as shown in FIG. 32, network system 100 integrates fifth cluster 338 and seventh cluster 342, thereby constructing eighth cluster 344.

Every time cluster division/integration is performed, network system 100 reconstructs a stream transfer path as to stream transfer terminal 410 present in a newly divided or integrated cluster. In this case, network system 100 perform change of the stream relay path such that the influence of the existing stream relay path to the process of stream relay path reconstruction is minimized.

Figure 32:
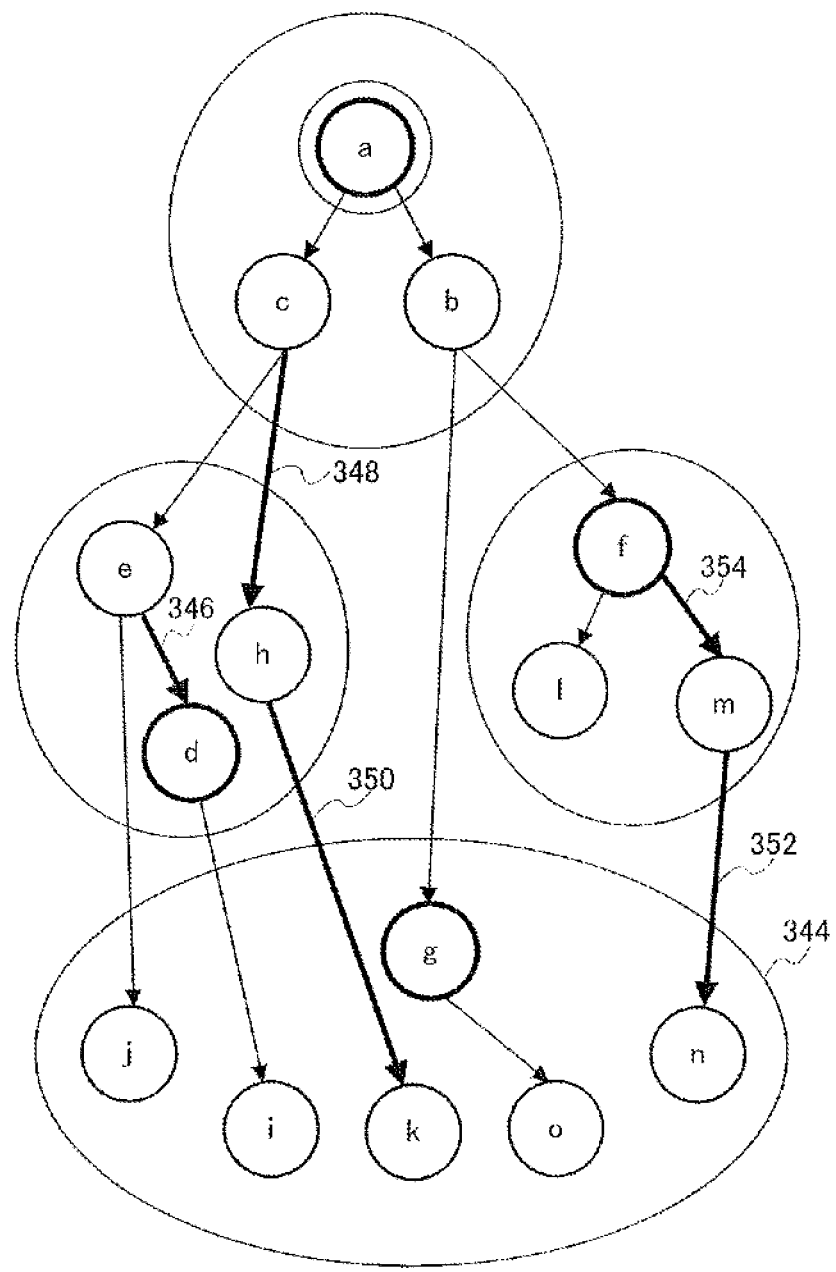
FIG. 32 shows an example of a state where cluster integration is performed according to the present embodiment.
Figure 33:
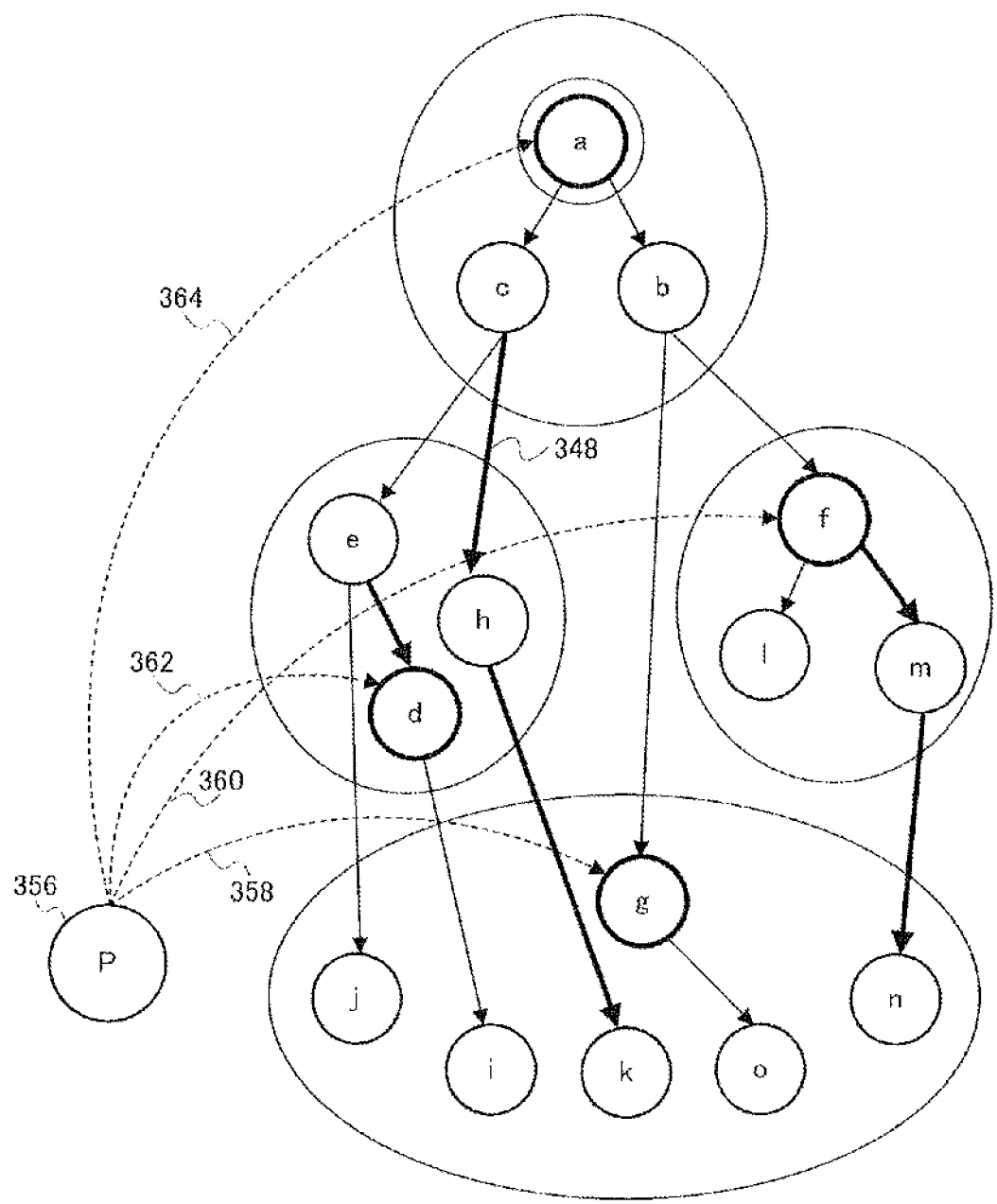
FIG. 33 shows an example of a state where a participant terminal is accepted according to the present embodiment.
Figure 34:
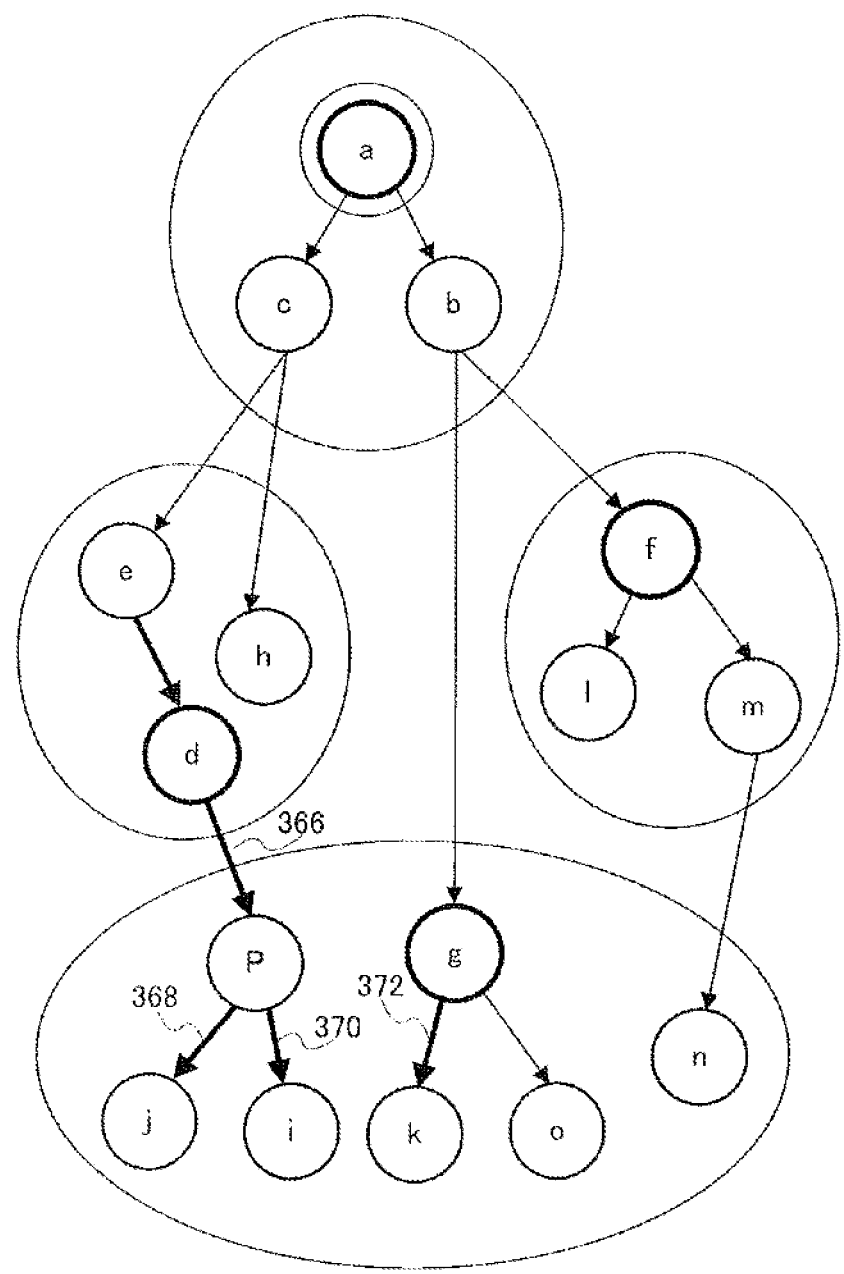
FIG. 34 shows an example of a reconstructed session configuration according to the present embodiment.

In an example shown in FIG. 32, network links 306, 310, 316, 320, and 326 shown in FIG. 2 are changed to network links 346, 348, 350, 352, and 354, respectively. Network system 100 does not select a network link such as network link 306 classified as low quality through evaluation at an earlier point, as a stream relay path. Such cluster division and integration result in all clusters having high sustainability, and therefore it is possible to accept participant terminal 356, as shown in FIG. 33.

Participant terminal 356 transmits a participation request into a session, to a cluster monitoring terminal of each cluster (S358, S360, S362, and S364). By receiving this participation request, network system 100 (terminal coordinator 421 of main control terminal 420) reconstructs a stream relay path to prevent a low quality network link. More specifically; network system 100 reconstructs a stream relay path, based on the resource available in a cluster, the delay from a route terminal to a leaf terminal at the most downstream of each stream relay path. As a result, for example, as shown in FIG.

34, network system 100 reconstructs low delay based AV stream transfer paths 366, 368, 370, and 372 to prevent a low quality network link.

As described above, network system 100 according to the present embodiment can determine to divide a cluster having a large number of lost packets to be received. Network system 100 according to the present embodiment can determine to integrate a cluster having difficulty to accept a participant terminal, with a parent cluster. By this means, network system 100 can determine a cluster formation so as to promptly add a participant terminal while maintaining stream relay path quality. That is, upon participating in a session of a communication terminal, it is possible to construct a stream transfer path in a short time and therefore it is possible to prevent the above overhead of reconstruction while maintaining high stream transfer quality.

Network system 100 determines whether or not it is difficult to accept a new participant terminal, using the whole network quality as a basis, based on the quality according to a relative comparison in the whole stream relay path. By this means, network system 100 can determine a cluster formation to secure the quality more reliably.

Network system 100 uses a network link loss rate for the analysis of cluster division/integration. Therefore, network system 100 can immediately reflect to the determination of cluster division/integration, even when network link quality deterioration such as an increase in packet loss, an increase in jitter, a long delay, and so forth occurs during stream transfer.

A method to evaluate cluster quality and cluster sustainability is not limited to the above examples.

As described above a communication terminal according to the present embodiment determines cluster division/integration in order to construct a stream relay path through a cluster basis in a network performing packet transfer based on terminal relay-type multipoint communication, and includes: a cluster quality calculation section to acquire cluster quality representing a small loss in a packet to be received per the cluster; a cluster sustainability calculation section to acquire cluster sustainability indicating the ease of receiving a participant terminal per the cluster; and a cluster division/integration analysis section to determine cluster division to a cluster having low cluster quality and to determine cluster integration to a cluster having high cluster quality and low cluster sustainability, with other cluster. It is assumed that the cluster quality is higher when a ratio of the number of low loss links that is a network link having low packet loss, to the number of all network links is lower, and the cluster sustainability is higher when the number of the low loss links of the cluster is larger. It is also assumed that the cluster sustainability is lower when a difference in the number of the low loss links between the cluster and a parent cluster is larger. Therefore, the present embodiment can determine a cluster formation so as to promptly perform addition of a participant terminal while maintaining the quality of a stream relay path.

The disclosure of Japanese Patent Application No. 201.0-229920, filed on Oct. 12, 2010, including the specification, drawings and abstract, is incorporated herein by reference in its entirety.

INDUSTRIAL APPLICABILITY

A communication terminal and a cluster monitoring method according to the present invention are useful as a communication terminal and a cluster monitoring method capable of determining promptly a cluster formation such as addition of a participant terminal, while securing the stream relay path quality.

REFERENCE SIGNS LIST

100 Network system
102 Network
104-108, 112-122, 126-136 Communication terminal
110, 124, 138 (330, 332, 334) Cluster
410 Stream transfer terminal
411 Streaming management section
412 AV stream communication section
420 Main control terminal
421 Terminal coordinator
422 Threshold definition section
430 Cluster monitoring terminal
431 Cluster management section
432 Cluster quality calculation section
433 Cluster sustainability calculation section
434 Cluster division/integration analysis section
435 Cluster metrics database

The invention claimed is:

1. A communication terminal determining a cluster formation to construct a stream relay path on a cluster basis in a network performing packet transfer according to terminal relay-type multipoint communication, the communication terminal comprising:
a cluster quality calculator that acquires cluster quality representing a small loss in a packet to be received, per the cluster;
a cluster sustainability calculator that acquires cluster sustainability representing ease of acceptance of a participant terminal, per the cluster; and
a cluster division/integration analyzer that determines cluster division with respect to a cluster having low cluster quality, and determining integration with other cluster with respect to a cluster having high cluster quality and low cluster sustainability,
wherein the cluster quality is higher when a ratio of the number of low loss links that are network links having a low packet loss to the number of all network links is higher, and the cluster sustainability is higher when the number of the low loss links of the cluster is larger,
wherein the cluster quality calculator, the cluster sustainability calculator, and the cluster division/integration analyzer are stored in a memory which is executable by a processor.

2. The communication terminal according to claim 1, wherein the cluster sustainability is lower when a difference in the number of the low loss links between the cluster and a parent cluster is larger.

3. The communication terminal according to claim 2, wherein the cluster sustainability is higher when the number of the low loss links of the parent cluster is smaller, and the cluster sustainability is higher when a maximum value of the difference in the number of the low loss links for each adjacent cluster group in a transfer path of the packet transfer is smaller.

4. The communication terminal according to claim 3, wherein the cluster sustainability is lower when the difference in the number of the low loss links between the cluster and a child cluster is larger.

5. The communication terminal according to claim 4, wherein the cluster sustainability is higher when the number of the low loss links of the child cluster is smaller, and the cluster sustainability is higher when the maximum value of the difference in the number of the low loss links for each adjacent cluster group in the transfer path of the packet transfer is smaller.

6. The communication terminal according to claim 5, wherein the cluster division/integration analyzer determines:
   cluster division when a value representing a degree of the cluster quality is equal to or lower than a cluster quality threshold determined based on the cluster quality of the whole network; and
   integration with the other cluster when the value representing the degree of the cluster quality is equal to or higher than the cluster quality threshold, and the value representing the degree of the cluster sustainability is equal to or lower than a cluster sustainability threshold determined based on the cluster sustainability of the whole network.

7. The communication terminal according to claim 6, wherein:
   the packet is a packet of stream data; and
   the packet loss is measurable information with continuing to transfer the stream data.

8. A cluster monitoring method determining a cluster formation to construct a stream relay path on a cluster basis in a network performing packet transfer according to terminal relay-type multipoint communication, the cluster monitoring method comprising:
   acquiring cluster quality representing a small loss in a packet to be received and cluster sustainability representing ease of acceptance of a participant terminal, per the cluster; and
   determining cluster division with respect to a cluster having low cluster quality, and determining integration with other cluster with respect to a cluster having high cluster quality and low cluster sustainability,
   wherein the cluster quality is higher when a ratio of the number of low loss links that are network links having a low packet loss to the number of all network links is higher, and the cluster sustainability is higher when the number of the low loss links of the cluster is larger.

* * * * *